United States Patent
Birmingham

(10) Patent No.: US 11,715,852 B2
(45) Date of Patent: *Aug. 1, 2023

(54) NANOFLUID CONTACT POTENTIAL DIFFERENCE BATTERY

(71) Applicant: Birmingham Technologies, Inc., Arlington, VA (US)

(72) Inventor: Joseph G. Birmingham, Arlington, VA (US)

(73) Assignee: Birmingham Technologies, Inc., Arlington, VA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/670,838

(22) Filed: Feb. 14, 2022

(65) Prior Publication Data
US 2022/0173458 A1 Jun. 2, 2022

Related U.S. Application Data

(60) Continuation of application No. 16/745,071, filed on Jan. 16, 2020, now Pat. No. 11,251,477, which is a
(Continued)

(51) Int. Cl.
*H01M 14/00* (2006.01)
*H01M 4/36* (2006.01)
(Continued)

(52) U.S. Cl.
CPC ........... *H01M 14/00* (2013.01); *H01M 4/366* (2013.01); *H01M 4/38* (2013.01); *H01M 4/381* (2013.01);
(Continued)

(58) Field of Classification Search
CPC ....... H02N 3/00; H02N 14/00; H01M 50/411; H01M 4/366; H01M 4/38; H01M 4/381; H01M 4/48; H01M 6/36
See application file for complete search history.

(56) References Cited

U.S. PATENT DOCUMENTS 2,876,368 A 3/1959 Thomas
3,376,437 A 4/1968 Meyerand, Jr. et al.
(Continued)

FOREIGN PATENT DOCUMENTS

CN 100382256 4/2008
CN 106452287 6/2018
(Continued)

OTHER PUBLICATIONS

Tang, J. et al., "Emerging Energy Harvesting Technology for Electro/Photo-Catalytic Water Splitting Application," Catalysts, vol. 11, p. 142 (2021).
(Continued)

*Primary Examiner* — James Lee
(74) *Attorney, Agent, or Firm* — Lieberman & Brandsdorfer, LLC

(57) ABSTRACT

A nanofluid contact potential difference cell includes a cathode with a lower work function and an anode with a higher work function separated by a nanometer-scale spaced inter-electrode gap containing a nanofluid with intermediate work function nanoparticle clusters. The cathode comprises a refractory layer and a thin film of electrosprayed dipole nanoparticle clusters partially covering a surface of the refractory layer. A thermal power source, placed in thermal contact with the cathode, to drive an electrical current through an electrical circuit connecting the cathode and anode with an external electrical load in between. A switch is configured to intermittently connect the anode and the cathode to maintain non-equilibrium between a first current from the cathode to the anode and a second current from the anode to the cathode.

20 Claims, 14 Drawing Sheets

Related U.S. Application Data division of application No. 14/179,930, filed on Feb. 13, 2014, now Pat. No. 10,559,864.

(51) Int. Cl.

| | |
|---|---|
| *H01M 4/38* | (2006.01) |
| *H01M 4/48* | (2010.01) |
| *H01M 6/36* | (2006.01) |
| *H01M 50/411* | (2021.01) |

(52) U.S. Cl.
CPC .............. *H01M 4/48* (2013.01); *H01M 6/36* (2013.01); *H01M 50/411* (2021.01); *Y10T 29/49224* (2015.01)

(56) References Cited

U.S. PATENT DOCUMENTS

| | | |
|---|---|---|
| 3,601,638 A | 8/1971 | Busse |
| 3,683,209 A | 8/1972 | Gross et al. |
| 3,798,475 A | 3/1974 | Campagnuolo et al. |
| 3,839,094 A | 10/1974 | Campagnuolo |
| 4,264,641 A | 4/1981 | Mahoney et al. |
| 4,628,143 A | 12/1986 | Brotz |
| 4,762,975 A | 8/1988 | Mahoney et al. |
| 4,900,368 A | 2/1990 | Brotz |
| 4,995,231 A | 2/1991 | Smith et al. |
| 4,996,457 A | 2/1991 | Hawsey et al. |
| 5,001,381 A | 3/1991 | Watanabe |
| 5,008,579 A | 4/1991 | Conley et al. |
| 5,071,233 A | 12/1991 | Habib et al. |
| 5,375,421 A | 12/1994 | Hsieh |
| 5,578,886 A | 11/1996 | Holmlid et al. |
| 5,606,213 A | 2/1997 | Kherani et al. |
| 5,787,965 A | 8/1998 | Sterett et al. |
| 5,960,853 A | 10/1999 | Sterett et al. |
| 5,989,824 A | 11/1999 | Birmingham et al. |
| 5,994,638 A | 11/1999 | Edelson |
| 6,037,697 A | 3/2000 | Begg et al. |
| 6,062,392 A | 5/2000 | Birmingham et al. |
| 6,067,474 A | 5/2000 | Schulman et al. |
| 6,110,247 A | 8/2000 | Birmingham et al. |
| 6,181,049 B1 | 1/2001 | Streckert et al. |
| 6,287,714 B1 | 9/2001 | Xiao et al. |
| 6,294,858 B1 | 9/2001 | King et al. |
| 6,456,692 B1 | 9/2002 | Smith |
| 6,492,792 B1 | 12/2002 | Johnson, Jr. et al. |
| 6,619,063 B1 | 9/2003 | Brumett |
| 6,722,872 B1 | 4/2004 | Swanson et al. |
| 6,774,532 B1 | 8/2004 | Marshall et al. |
| 7,073,561 B1 | 7/2006 | Henn |
| 7,081,684 B2 | 7/2006 | Patel et al. |
| 7,220,971 B1 | 5/2007 | Chang et al. |
| 7,258,716 B2 | 8/2007 | Shekarriz et al. |
| 7,259,109 B2 | 8/2007 | Meagley |
| 7,315,102 B2 | 1/2008 | Minagawa |
| 7,327,026 B2 | 2/2008 | Shimogishi et al. |
| 7,524,528 B2 | 4/2009 | Kodas et al. |
| 7,651,926 B2 | 1/2010 | Jacobson et al. |
| 7,701,576 B2 | 4/2010 | Moore et al. |
| 7,737,356 B2 | 5/2010 | Goldstein |
| 7,898,096 B1 | 3/2011 | Krupenkin |
| 7,906,182 B1 | 3/2011 | Schlat |
| 7,951,428 B2 | 5/2011 | Hoerr et al. |
| 8,040,008 B2 | 10/2011 | Kawamura et al. |
| 8,093,144 B2 | 1/2012 | Jacobson et al. |
| 8,182,982 B2 | 5/2012 | Korbin |
| 8,188,456 B2 | 5/2012 | Nemanich et al. |
| 8,192,920 B2 | 6/2012 | Kobrin |
| 8,318,386 B2 | 11/2012 | Kobrin |
| 8,334,217 B2 | 12/2012 | Kobrin |
| 8,367,525 B2 | 2/2013 | Jacobson et al. |
| 8,373,326 B2 | 2/2013 | Enomoto et al. |
| 8,425,789 B2 | 4/2013 | Kobrin |
| 8,518,633 B1 | 8/2013 | Kobrin et al. |
| 8,621,245 B2 | 12/2013 | Shearer et al. |
| 8,624,100 B2 | 1/2014 | Orem |
| 8,816,633 B1 | 8/2014 | Neal et al. |
| 8,853,531 B2 | 10/2014 | Schwede et al. |
| 8,907,352 B2 | 12/2014 | Naito |
| 8,976,508 B2 | 3/2015 | Tamachi et al. |
| 9,069,244 B2 | 6/2015 | Kobrin |
| 9,073,937 B2 | 7/2015 | Frazier et al. |
| 9,116,430 B2 | 8/2015 | Kobrin et al. |
| 9,166,405 B2 | 10/2015 | Brandt et al. |
| 9,244,356 B1 | 1/2016 | Kobrin et al. |
| 9,465,296 B2 | 10/2016 | Kobrin |
| 9,472,699 B2 | 10/2016 | Kotter |
| 9,481,112 B2 | 11/2016 | Kobrin et al. |
| 9,559,617 B2 | 1/2017 | Landa et al. |
| 9,645,504 B2 | 5/2017 | Kobrin |
| 9,722,420 B2 | 8/2017 | Teggatz et al. |
| 9,726,790 B2 | 8/2017 | Boyd et al. |
| 9,726,791 B2 | 8/2017 | Boyd et al. |
| 9,782,917 B2 | 10/2017 | Kobrin et al. |
| 9,786,718 B1 | 10/2017 | Boyd |
| 9,793,317 B1 | 10/2017 | Boyd et al. |
| 9,865,789 B2 | 1/2018 | Geballe et al. |
| 9,893,261 B1 | 2/2018 | Boyd et al. |
| 9,923,514 B1 | 3/2018 | Boyd et al. |
| 9,981,410 B2 | 5/2018 | Kobrin et al. |
| 10,014,461 B1 | 7/2018 | Boyd et al. |
| 10,056,538 B1 | 8/2018 | Boyd |
| 10,079,561 B1 | 9/2018 | Boyd |
| 10,096,648 B2 | 10/2018 | Boyd |
| 10,103,654 B2 | 10/2018 | Yun et al. |
| 10,109,672 B2 | 10/2018 | Boyd et al. |
| 10,109,781 B1 | 10/2018 | Boyd |
| 10,110,163 B2 | 10/2018 | Boyd et al. |
| 10,122,223 B2 | 11/2018 | Takezaki et al. |
| 10,186,650 B2 | 1/2019 | Schwede et al. |
| 10,199,658 B2 | 2/2019 | Edington et al. |
| 10,202,178 B2 | 2/2019 | Himmelmann |
| 10,247,861 B2 | 4/2019 | Boyd et al. |
| 10,249,810 B2 | 4/2019 | Boyd et al. |
| 10,345,491 B2 | 7/2019 | Boyd et al. |
| 10,345,492 B2 | 7/2019 | Boyd et al. |
| 10,347,777 B2 | 7/2019 | Boyd et al. |
| 10,418,578 B2 | 9/2019 | Yuan et al. |
| 10,476,021 B2 | 11/2019 | Xu et al. |
| 10,525,684 B2 | 1/2020 | Boyd et al. |
| 10,529,871 B2 | 1/2020 | Boyd et al. |
| 10,546,991 B2 | 1/2020 | Boyd |
| 10,547,060 B2 | 1/2020 | Shitikov |
| 10,553,774 B2 | 2/2020 | Boyd |
| 10,559,864 B2 | 2/2020 | Birmingham |
| 10,600,950 B2 | 3/2020 | Boyd et al. |
| 10,690,485 B2 | 6/2020 | Koester et al. |
| 10,807,119 B2 | 10/2020 | Birmingham |
| 10,840,788 B2 | 11/2020 | McMullen et al. |
| 10,859,480 B2 | 12/2020 | Koester et al. |
| 10,905,011 B2 | 1/2021 | Kami et al. |
| 10,950,706 B2 | 3/2021 | Birmingham |
| 10,985,677 B2 | 4/2021 | Boyd et al. |
| 11,025,139 B2 | 6/2021 | Li et al. |
| 11,046,578 B2 | 6/2021 | Birmingham |
| 11,101,421 B2 | 8/2021 | Birmingham |
| 11,124,864 B2 | 9/2021 | Birmingham |
| 11,244,816 B2 | 2/2022 | Birmingham |
| 11,251,477 B2 | 2/2022 | Birmingham |
| 11,417,506 B1 | 8/2022 | Birmingham |
| 11,424,458 B2 | 8/2022 | Shitikov |
| 2001/0034296 A1 | 10/2001 | Xiao et al. |
| 2004/0099304 A1 | 5/2004 | Cox |
| 2005/0016575 A1 | 1/2005 | Kumar et al. |
| 2005/0104185 A1 | 5/2005 | Shimogishi et al. |
| 2005/0257515 A1 | 11/2005 | Song |
| 2006/0068611 A1 | 3/2006 | Weaver et al. |
| 2006/0137732 A1 | 6/2006 | Farahani et al. |
| 2006/0159999 A1 | 7/2006 | Kejha et al. |
| 2006/0214535 A1 | 9/2006 | Salmon |
| 2007/0034426 A1 | 2/2007 | Akamatsu et al. |
| 2007/0182362 A1 | 8/2007 | Trainor et al. |
| 2007/0292941 A1 | 12/2007 | Handique et al. |
| 2008/0017237 A1 | 1/2008 | Bray et al. |

(56) References Cited

U.S. PATENT DOCUMENTS

| | | |
|---|---|---|
| 2008/0053509 A1 | 3/2008 | Flitsch et al. |
| 2008/0066796 A1 | 3/2008 | Mitchell et al. |
| 2008/0149158 A1 | 6/2008 | Logan et al. |
| 2008/0185475 A1 | 8/2008 | Fuller |
| 2008/0194009 A1 | 8/2008 | Marentis |
| 2009/0071526 A1 | 3/2009 | Parker |
| 2009/0140465 A1 | 6/2009 | Plumpton |
| 2010/0027753 A1 | 2/2010 | Venugpal et al. |
| 2010/0051092 A1 | 3/2010 | Dumitru et al. |
| 2010/0068406 A1 | 3/2010 | Man |
| 2010/0165784 A1 | 7/2010 | Jovanovich et al. |
| 2010/0291429 A1 | 11/2010 | Farmer |
| 2010/0326487 A1 | 12/2010 | Komori et al. |
| 2011/0104546 A1 | 5/2011 | Seino et al. |
| 2011/0146064 A1 | 6/2011 | Feaver et al. |
| 2011/0148248 A1 | 6/2011 | Landa |
| 2011/0298333 A1 | 12/2011 | Pilon |
| 2012/0153772 A1 | 6/2012 | Landa |
| 2012/0222737 A1 | 9/2012 | Conibeer et al. |
| 2012/0274046 A1 | 11/2012 | Trout |
| 2013/0062457 A1 | 3/2013 | Deakin |
| 2013/0101729 A1 | 4/2013 | Keremes et al. |
| 2013/0180562 A1 | 7/2013 | Monfray et al. |
| 2013/0206199 A1 | 8/2013 | Lassiter et al. |
| 2013/0313745 A1 | 11/2013 | Ikushima |
| 2014/0230875 A1 | 8/2014 | Angermann et al. |
| 2014/0272504 A1 | 9/2014 | Edington et al. |
| 2014/0349430 A1 | 11/2014 | Kim |
| 2015/0024516 A1 | 1/2015 | Siebel et al. |
| 2015/0079504 A1 | 3/2015 | Farrugia |
| 2015/0087144 A1 | 3/2015 | Liu et al. |
| 2015/0112448 A1 | 4/2015 | Scott et al. |
| 2015/0132471 A1 | 5/2015 | Hibbs et al. |
| 2015/0207457 A1 | 7/2015 | Trucchi et al. |
| 2015/0210400 A1 | 7/2015 | Gonidec et al. |
| 2015/0211499 A1 | 7/2015 | Morin |
| 2015/0229013 A1 | 8/2015 | Birmingham et al. |
| 2015/0243867 A1 | 8/2015 | Geballe et al. |
| 2015/0251213 A1 | 9/2015 | Birmingham et al. |
| 2016/0305367 A1 | 10/2016 | Ghoshal |
| 2017/0106082 A1 | 4/2017 | Birmingham |
| 2017/0106083 A1 | 4/2017 | Birmingham |
| 2017/0126150 A1 | 5/2017 | Wang |
| 2017/0155098 A1 | 6/2017 | Park et al. |
| 2017/0252807 A1 | 9/2017 | Lund et al. |
| 2017/0358432 A1 | 12/2017 | Wang |
| 2018/0083176 A1 | 3/2018 | Ryu et al. |
| 2018/0230604 A1 | 8/2018 | Al-Kandari |
| 2018/0294748 A1 | 10/2018 | Boyd et al. |
| 2019/0013352 A1 | 1/2019 | Boyd |
| 2019/0013456 A1 | 1/2019 | Boyd |
| 2019/0019981 A1 | 1/2019 | Kim et al. |
| 2019/0027347 A1 | 1/2019 | Schwede et al. |
| 2019/0036111 A1 | 1/2019 | Xiao et al. |
| 2019/0043918 A1 | 2/2019 | Boyd |
| 2019/0058004 A1 | 2/2019 | Boyd et al. |
| 2019/0214675 A1 | 7/2019 | Christensen et al. |
| 2019/0214845 A1 | 7/2019 | Hausman, Jr. et al. |
| 2019/0267846 A1 | 8/2019 | Shearer et al. |
| 2019/0287773 A1 | 9/2019 | Choi et al. |
| 2019/0356267 A1 | 11/2019 | Ganley |
| 2020/0002828 A1 | 1/2020 | Mills |
| 2020/0144039 A1 | 5/2020 | Schmitt et al. |
| 2020/0153069 A1 | 5/2020 | Birmingham |
| 2020/0161667 A1 | 5/2020 | Shitikov |
| 2020/0168781 A1 | 5/2020 | Boyd |
| 2020/0273959 A1 | 8/2020 | Birmingham |
| 2020/0274045 A1 | 8/2020 | Birmingham |
| 2020/0274046 A1 | 8/2020 | Birmingham |
| 2020/0303132 A1 | 9/2020 | Bhattacharjee et al. |
| 2020/0313108 A1 | 10/2020 | Jang et al. |
| 2020/0346736 A1 | 11/2020 | Krasnoff |
| 2020/0357595 A1 | 11/2020 | Velásquez-García et al. |
| 2020/0368848 A1 | 11/2020 | Birmingham et al. |
| 2020/0369516 A1 | 11/2020 | Birmingham et al. |
| 2020/0370158 A1 | 11/2020 | Birmingham et al. |
| 2021/0050800 A1 | 2/2021 | Jones et al. |
| 2021/0050801 A1 | 2/2021 | Jones et al. |
| 2021/0086208 A1 | 3/2021 | Birmingham et al. |
| 2021/0091291 A1 | 3/2021 | Birmingham et al. |
| 2021/0091685 A1 | 3/2021 | Birmingham et al. |
| 2021/0135600 A1 | 5/2021 | Thibado et al. |
| 2021/0143700 A1 | 5/2021 | Yao et al. |
| 2021/0211069 A1 | 7/2021 | Reed et al. |
| 2021/0251548 A1 | 8/2021 | Bose et al. |
| 2022/0020555 A1 | 1/2022 | Loesch et al. |
| 2022/0021290 A1 | 1/2022 | Mills |
| 2022/0052580 A1 | 2/2022 | Veneman |

FOREIGN PATENT DOCUMENTS

| | | |
|---|---|---|
| EP | 2849334 | 3/2015 |
| JP | 2006086510 | 3/2006 |
| JP | 4901049 | 3/2012 |
| JP | 6147901 | 6/2017 |
| JP | 6411612 | 10/2018 |
| JP | 6411613 | 10/2018 |
| JP | 6521400 | 5/2019 |
| JP | 6521401 | 5/2019 |
| JP | 6524567 | 6/2019 |
| JP | 6598339 | 10/2020 |
| JP | 6828939 | 2/2021 |
| KR | 20090106247 | 10/2009 |
| KR | 20170138772 | 12/2017 |
| KR | 20180107194 | 10/2018 |
| WO | 2006076036 | 7/2006 |
| WO | 2007070524 | 6/2007 |
| WO | 2009004345 | 1/2009 |
| WO | 2014186783 | 11/2014 |
| WO | 2014204549 | 12/2014 |
| WO | 2017214179 | 12/2017 |
| WO | 2018036599 | 3/2018 |
| WO | 2019088001 | 5/2019 |
| WO | 2020176344 | 9/2020 |
| WO | 2020176345 | 9/2020 |
| WO | 2020184234 | 9/2020 |
| WO | 2020184235 | 9/2020 |
| WO | 2020235254 | 11/2020 |
| WO | 2020236776 | 11/2020 |
| WO | 2021030489 | 2/2021 |
| WO | 2021061995 | 4/2021 |
| WO | 2021061996 | 4/2021 |
| WO | 2021061997 | 4/2021 |
| WO | 2012114366 | 8/2021 |
| WO | 2021191629 | 9/2021 |

OTHER PUBLICATIONS

Taqavi, O. et al., "Design aspects, winding arrangements and applications of printed circuit board motors: a comprehensive review," IET Electric Power Applications, vol. 14, pp. 1505-1518 (2020).

Tatsuma, T. et al., "Energy Storage of TiO2—WO3 Photocatalysis Systems in the Gas Phase," Langmuir, vol. 18, pp. 7777-7779 (2002).

Tatsuma, T. et al., "TiO2—WO3 Photoelectrochemical Anticorrosion System with an Energy Storage Ability," Chemistry of Materials, vol. 13, pp. 2838-2842 (2001).

Taylor, Geoffrey, "Disintegration of water drops in an electric field," Proc. R. Soc. A, vol. 280, pp. 383-397 (1964).

Tee, S.Y. et al., "Recent Progress in Energy-Driven Water Splitting," Advanced Science, vol. 4, p. 1600337 (2017).

Templeton, Allen C. et al., "Monolayer-Protected Cluster Molecules," Accounts of Chemical Research, vol. 33, No. 1, pp. 27-36 (2000).

Tepper, Gary et al., "An electrospray-based, ozone-free air purification technology," Journal of Applied Physics, vol. 102, pp. 113305-1-113305-6 (2007).

Thi, P. et al., "Demonstration of Enhanced Piezo-Catalysis for Hydrogen Generation and Water Treatment at the Ferroelectric Curie Temperature," iScience, vol. 23, p. 101095 (2020).

(56) References Cited

OTHER PUBLICATIONS

Thygesen, Kristian S. et al., "Partly occupied Wannier functions," Physical Review Letters, vol. 94, pp. 026405-1-026405-4 (2005).

Tsai, M. et al., "Design of a miniature axial-flux spindle motor with rhomboidal PCB winding," IEEE Transactions on Magnetics, vol. 42, pp. 3488-3490 (2006).

Tsuji, N. et al., "Strength and ductility of ultrafine grained aluminum and iron produced by ARB and annealing," Scripta Materialia, vol. 47, pp. 893-899 (2002).

Turner, J.A., "A Realizable Renewable Energy Future," Science, vol. 285, pp. 687-689 (1999).

Turner, J.A., "Sustainable Hydrogen Production," Science, vol. 305, pp. 972-974 (2004).

Ulrich, Marc D. et al., "Comparison of solid-state thermionic refrigeration with thermoelectric refrigeration," Journal of Applied Physics, vol. 90, No. 3, pp. 1625-1631 (2001).

Vaccarini, L. et al., "Purification procedure of carbon nanotubes," Synthetic Metals, vol. 103, pp. 2492-2493 (1999).

Valiev, R. Z. et al., "Bulk nanostructured materials from severe plastic deformation," Progress in Materials Science, vol. 45, pp. 103-189 (2000).

Valiev, R.Z. et al., "Producing Bulk Ultrafine-Grained Materials by Severe Plastic Deformation," Journal of Materials, vol. 58, Issue 4, p. 33 (2006).

Valiev, R.Z. et al., "Paradox of strength and ductility in metals processed by severe plastic deformation," Journal of Materials Research, vol. 17, No. 1, pp. 5-8 (2002).

Van Turnhout, J. et al., "Electret Filters for High-Efficiency Air Cleaning," Journal of Electrostatics, vol. 8, pp. 369-379 (1980).

Van Turnhout, J., "The Use of Polymers for Electrets," Journal of Electrostatics, vol. 1, pp. 147-163 (1975).

Vanherpe, L. et al., "Pinning effect of spheroid second-phase particles on grain growth studied by three-dimensional phase-field simulations", Computational Materials Science 49 (2010) 340-350.

Vlahos, V. et al., "Ab initio investigation of barium-scandium-oxygen coatings on tungsten for electron emitting cathodes," Physical Review B, vol. 81, p. 054207 (2010).

Wada, Motoi et al., "Effective Work Function of an Oxide Cathode in Plasma," J. Plasma Fusion Res. Series, vol. 8, pp. 1366-1369 (2009).

Walker, A.M. et al., "An axial flux machine design with an airgap winding using flat conductors," IET Conference Proceedings, pp. 221-225 (2006).

Wang, C.S., "High photoemission efficiency of submonolayer cesium-covered surfaces," Journal of Applied Physics, vol. 48, pp. 1477-1479 (1977).

Wang, J. et al., "A bi-functional device for self-powered electrochromic window and self-rechargeable transparent battery applications," Nature Communications, vol. 5, p. 4921 (2014).

Wang, S. et al., "Nanoscale triboelectric-effect-enabled energy conversion for sustainably powering portable alectronics," Nano Letters, vol. 12, pp. 6339-6346 (2012).

Wang, X. et al., "Design of multi-layer PCB coreless axial permanent magnet synchronous motor," 2019 22nd International Conference on Electrical Machines and Systems (ICEMS), pp. 1-4 (2019)P.

Wang, X. et al., "Winding design and analysis for a disc-type permanent-magnet synchronous motor with a PCB stator," Energies, vol. 11, pp. 3383-3397 (2018).

Wang, Y. et al.,"High tensile ductility in a nanostructured metal", Nature, 419 (2002), 912-915.

Wang, Y. M. et al., "Enhanced tensile ductility and toughness in nanostructured Cu," Applied Physics Letters, vol. 80, pp. 2395-2397 (2002).

Wang, Z. L. et al., "Toward the blue energy dream by triboelectric nanogenerator networks," Nano Energy, vol. 39, pp. 9-23 (2017).

Wang, Z.L. et al., "Nanotechnology-Enabled Energy Harvesting for Self-Powered Micro-/Nanosystems," Angewandte Chemie International Edition, vol. 51, pp. 2-24 (2012).

Wang, Z.L. et al., "Piezoelectric Nanogenerators Based on Zinc Oxide Nanowire Arrays," Science, vol. 312, pp. 242-246 (2006).

Wang, Z.L., "Self-Powered Nanotech," Scientific America, vol. 298, pp. 82-87 (2008).

Wang, Z.L., "Triboelectric nanogenerators as new energy technology and self-powered sensors—Principles, problems and perspectives," Faraday Discussions, vol. 176, pp. 447-458 (2014).

Watanabe, Satoru et al., "Secondary electron emission and glow discharge properties of 12CaO—7Al2O3 electride for fluorescent lamp applications," Science and Technology of Advanced Materials, vol. 12, pp. 1-8 (2011).

Weaver, Stan et al., "Thermotunneling Based Cooling Systems for High Efficiency Buildings," GE Global Research, DOE Project: DE-FC26-04NT42324 (2007).

Weertman, J.R. et al., "Structure and Mechanical Behavior of Bulk Nanocrystalline Materials," Materials Research Society Bulletin, vol. 24, pp. 44-50 (1999).

Weiss, C. et al., "Accuracy of a mechanical single-electron shuttle," Europhysics Letters, vol. 47, No. 1, p. 97 (1999).

Weissmuller, J., "Alloy Effects in Nanostructures" Nanostructured Materials, vol. 3, pp. 261-272 (1993).

Wohrle, D. et al., "Organic Solar Cells," Advanced Materials, vol. 3, pp. 129-138 (1991).

Wong, L.S.Y. et al., "A very low-power CMOS mixed-signal IC for implantable pacemaker applications," IEEE Journal of Solid-State Circuits, vol. 39, pp. 2446-2456 (2004).

Wooten, L.A. et al., "Evaporation of Barium and Strontium from Oxide-Coated Cathodes," Journal of Applied Physics, vol. 26, pp. 44-51 (1955).

Wu, C. et al., "A spring-based resonance coupling for hugely enhancing the performance of triboelectric nanogenerators for harvesting low-frequency vibration energy," Nano Energy, vol. 32, pp. 287-293 (2017).

Xiao, T.D. et al., "Synthesis of Nanostructured Ni/Cr and Ni—Cr3C2 Powders by an Organic Solution Reaction Method," Nanostructured Materials, vol. 7, No. 8, pp. 857-871 (1996).

Xiao, T.D. et al., "Synthesis of Si(N,C) nanostructured powders from an organometallic aerosol using a hot-wall reactor," Journal of Materials Science, vol. 28, pp. 1334-1340 (1993).

Xu, J. et al., "Current distribution in reinforced concrete cathodic protection system with conductive mortar overlay anode," Construction and Building Materials, vol. 23, pp. 2220-2226 (2009).

Xu, S. et al., "Piezoelectric-nanowire-enabled power source for driving wireless microelectronics," Nature Communications, vol. 1, p. 93 (2010).

Updated International Search Report PCT/US2021/050831, dated Apr. 20, 2022.

Updated Written Opinion PCT/US2021/050831, dated Apr. 20, 2022.

Office Action, U.S. Appl. No. 16/817,112, dated Apr. 12, 2022.

Office Action, U.S. Appl. No. 16/817,122, dated Apr. 7, 2022.

Eaton Ellipse ECO spec sheet, pp. 1-2 (2011).

Im, Hyeongwook, et al., "High-efficiency electrochemical thermal energy harvester using carbon nanotube aerogel sheet electrodes", Nature Communications 7, Article No. 10600, (2016).

Pearson, Amanda, "10 advantages of 3D printing", (2018).

Zebarjadi, Mona, "Thermionic and Thermoelectric Power Generators", University of Virginia, (2010), pp. 1-19.

Updated List of Assignee Patents and/or Patent Applications of Assignee, May 2022.

Xu, S. et al., "Self-powered nanowire devices," Nature Nanotechnology, vol. 5, pp. 366-373 (2010).

Yamamoto, Shigehiko, "Fundamental physics of vacuum electron sources," Reports on Progress in Physics, vol. 69, pp. 181-232 (2006).

Yamasaki, T. et al., "Formation of metal-TIN/TiC nanocomposite powders by mechanical alloying and their consolidation," Materials Science and Engineering A, vol. 350, pp. 168-172 (2003).

Kang, H. et al., "NiO/Graphene Composite for Enhanced Charge Separation and Collection in p-Type Dye Sensitized Solar Cell," Journal of Physical Chemistry C, vol. 115, pp. 12209-12215 (2011).

Kang, R et al., "Converting Biomechanical Energy into Electricity by a Muscle-Movement-Driven Nanogenerator," Nano Letters, vol. 9, pp. 1201-1205 (2009).

(56) References Cited

OTHER PUBLICATIONS

Yang, X. et al., "A self-powered electrochromic device driven by a nanogenerator," Energy and Environmental Science, vol. 5, p. 9462 (2012).
Yeh, M.-H. et al., "Motion-Driven Electrochromic Reactions for Self-Powered Smart Window System," ACS Nano, vol. 9, pp. 4757-4765 (2015).
Yeh, M.-H. et al., "Rolling Friction Enhanced Free-Standing Triboelectric Nanogenerators and their Applications in Self-Powered Electrochemical Recovery Systems," Advanced Functional Materials, vol. 26, pp. 1054-1062 (2016).
Yu, G. et al., "Assembly and Integration of Semiconductor Nanowires for Functional Nanosystems," Pure and Applied Chemistry, vol. 82, pp. 2295-2314 (2010).
Yuan, J. et al., "Characterization of Sol-Gel-Derived TiO2 Coatings and Their Photoeffects on Copper Substrates," Journal of The Electrochemical Society, vol. 142, pp. 3444-3450 (1995).
Zhang, C. et al., "Theoretical Comparison, Equivalent Transformation, and Conjunction Operations of Electromagnetic Induction Generator and Triboelectric Nanogenerator for Harvesting Mechanical Energy," Advanced Materials, vol. 26, pp. 3580-3591 (2014).
Zhang, H. et al., "Simultaneously Harvesting Thermal and Mechanical Energies based on Flexible Hybrid Nanogenerator for Self-Powered Cathodic Protection," ACS Applied Materials and Interfaces, vol. 7, pp. 28142-28147 (2015).
Zhang, X. et al., "Conversion of solar power to chemical energy based on carbon nanoparticle modified photo-thermoelectric generator and electrochemical water splitting system," Nano Energy, vol. 48, pp. 481-488 (2018).
Zhang, Y. et al., "Control of Electro-Chemical Processes Using Energy Harvesting Materials and Devices," Chemical Society Reviews, vol. 46, pp. 7757-7786 (2017).
Zhao, Y.P., "Morphological stability of epitaxial thin elastic films by van der Waals force," Archive of Applied Mechanics, vol. 72, pp. 77-84 (2002).
Zharin, Anatoly L. et al., "Application of the contact potential difference technique for on-line rubbing surface monitoring (review)," Tribology Letters, vol. 4, pp. 205-213 (1998).
Zheng, Q. et al., "In-Vivo Powering of Pacemaker by Breathing-Driven Implanted Triboelectric Nanogenerator," Advanced Materials, vol. 26, pp. 5851-5856 (2014).
Zhong, Y. et al., "Integration of Energy Harvesting and Electrochemical Storage Devices," Advanced Materials Technologies, vol. 2, p. 1700182 (2017).
Zhu, G. et al., "A Shape-Adaptive Thin-Film-Based Approach for 50% High-Efficiency Energy Generation through Micro-Grating Sliding Electrification," Advanced Materials, vol. 26, pp. 3788-3796 (2014).
Zhu, H.R. et al., "Self-powered metal surface anti-corrosion protection using energy harvested from rain drops and wind," Nano Energy, vol. 14, pp. 193-200 (2014).
Zhu, Moxuan, "Experimental Measurements of Thermoelectric Phenomena in Nanoparticle Liquid Suspensions (Nanofluids)," Graduate Thesis, Arizona State University, Dec. 2010.
Ziegler-Graham, K. et al., "Estimating the prevalence of limb loss in the United States: 2005 to 2050," Archives of Physical Medicine and Rehabilitation, vol. 89, pp. 422-429 (2008).
Zuo, K. J. et al., "The evolution of functional hand replacement: From iron prostheses to hand transplantation," Plastic Surgery, vol. 22, pp. 44-51, (2014).
Zurbuchen, A. et al., "Energy Harvesting from the Beating Heart by a Mass Imbalance Oscillation Generator," Annals of Biomedical Engineering, vol. 41, pp. 131-141 (2012).
Office Action, U.S. Appl. No. 17/003,266, filed Jul. 27, 2022.
Office Action, U.S. Appl. No. 16/906,508, filed Jul. 21, 2022.
Office Action, U.S. Appl. No. 16/416,858, filed Jul. 20, 2022.
Office Action, U.S. Appl. No. 16/864,759, filed Jul. 13, 2022.
Office Action, U.S. Appl. No. 17/407,450, filed Aug. 3, 2022.

Jang, G.H. et al., "Development of an axial-gap spindle motor for computer hard disk drives using PCB winding and dual air gaps," IEEE Transactions on Magnetics, vol. 38, pp. 3297-3299 (2002).
Jaworek, A., "Electrospray droplet sources for thin film deposition," Journal of Materials Science, vol. 42, Issue 1, pp. 266-297 (2007).
Jensen, K.L. et al., "A photoemission model for low work function coated metal surfaces and its experimental validation," Journal of Applied Physics, vol. 99, p. 124905 (2006).
Jung, S. et al., "Development of Annealing-Free, Solution-Processable Inverted Organic Solar Cells with N-Doped Graphene Electrodes using Zinc Oxide Nanoparticles," Nano Letters, vol. 18, pp. 1337-1343 (2018).
Kamalisarvestani, M. et al., "Performance, Materials and Coating Technologies of Thermochromic Thin Films on Smart Windows," Renewable and Sustainable Energy Reviews, vol. 26, pp. 353-364 (2013).
Karami, M.A. et al., "Powering pacemakers from heartbeat vibrations using linear and nonlinear energy harvesters," Applied Physics Letters, vol. 100, p. 042901 (2012).
Kawano, H., "Effective work functions for ionic and electronic emissions from mono- and polycrystalline surfaces," Progress in Surface Science, vol. 83, pp. 1-165 (2008).
Kilgrow, S. et al., "Harnessing of Low Temperature Geothermal and Waste Heat Using Power Chips™ in Varmaraf Heat Exchangers," International Geothermal Conference (2003).
Kirchheim, Reiner, "Grain coarsening inhibited by solute segregation," Acta Materialia, vol. 50, pp. 413-419 (2002).
Kirchheim, Reiner, "Reducing grain boundary, dislocation line and vacancy formation energies by solute segregation II. Experimental evidence and consequences," Acta Materialia, vol. 55, pp. 5139-5148 (2007).
Kirchheim, Reiner, "Reducing grain boundary, dislocation line and vacancy formation energies by solute segregation. I. Theoretical backround," Acta Materialia, vol. 55, pp. 5129-5138 (2007).
Kirsh, V.A. et al., "The Deposition of Aerosol Submicron Particles on Ultrafine Fiber Filters," Colloid Journal, vol. 66, pp. 311-315 (2004).
Kleemann, T. et al., "Annual rate of transvenous defibrillation lead defects in implantable cardioverter-defibrillators over a period of >10 years," Circulation, vol. 115, pp. 2474-2480 (2007).
Klimeck et al., "Quantum device simulation with a generalized tunneling formula," Appl. Phys. Lett., vol. 67, pp. 2539-2541 (1995).
Knippel, R. et al., "Printed circuit board structural properties and spiral groove trace conductors for hydrodynamic gap maintenance in axial flux rotating machines," 2019 IEEE Energy Conversion Congress and Exposition (ECCE), pp. 6084-6091 (2019).
Knoll, M. et al., "A self-writing smart label based on doping front migration," Electrochimica Acta, vol. 54, pp. 216-219 (2008).
Koch, C.C. et al., "Stabilization of nanocrystalline grain sizes by solute additions," Journal of Materials Science, vol. 43, pp. 7264-7272 (2008).
Koch, C.C et al., "Ductility of Nanostructured Materials," Materials Research Society Bulletin, vol. 24, pp. 54-58 (1999).
Koch, C.C., "Synthesis of nanostructured materials by mechanical milling: problems and opportunities," Nanostructured Materials, vol. 9, pp. 13-22 (1997).
Koeck, Franz A.M. et al., "Thermionic electron emission from low work-function phosphorus doped diamond films," Diamond Related Material, vol. 18, pp. 789-791 (2009).
Krupke, R. et al., "Simultaneous Deposition of Metallic Bundles of Single-walled Carbon Nanotubes Using Ac-dielectrophoresis," Nano Letters, vol. 3, pp. 1019-1023 (2003).
Krupke, Ralph et al., "Separation of Metallic from Semiconducting Single-Walled Carbon Nanotubes," Science, vol. 301, pp. 344-347 (2003).
Krupke, Ralph et al., "Surface Conductance Induced Dielectrophoresis of Semiconducting Single-Walled Carbon Nanotubes," Nano Letters, vol. 4, pp. 1395-1399 (2004).
Ku, I. et al., "Clinical outcomes of a low-cost single-channel myoelectric-interface three-dimensional hand prosthesis," Archives of Plastic Surgery, vol. 46, pp. 303-310 (2019).

(56) References Cited

OTHER PUBLICATIONS

Kuang, Y. et al., "Solar-Driven, Highly Sustained Splitting of Seawater into Hydrogen and Oxygen Fuels," Proceedings of the National Academy of Sciences of the United States of America, vol. 116, pp. 6624-6629 (2019).

Kuiken, T.A. et al., "Targeted reinnervation for enhanced prosthetic arm function in a woman with a proximal amputation: a case study," Lancet, vol. 369, pp. 371-380 (2007).

Kuiken, T.A. et al., "The use of targeted muscle reinnervation for improved myoelectric prosthesis control in a bilateral shoulder disarticulation amputee," Prosthetics and Orthotics International, vol. 28, pp. 245-253 (2004).

Lallart, M. et al., "Nonlinear energy harvesting," IOP Conference Series: Materials Science and Engineering, vol. 18, p. 092006 (2011).

Lamichhane, T.N. et al., "Additive manufacturing of soft magnets for electrical machines—a review," Materials Today Physics, vol. 15, p. 100255 (2020).

Landauer, R., "Spatial Variation of Currents and Fields Due to Localized Scatterers in Metallic Conduction," IBM Journal of Research and Development, vol. 1, pp. 223-231 (1957).

Laoun, B. et al., "Cathodic protection of a buried pipeline by solar energy," Revue des Energies Remouvelables, vol. 12, No. 1, pp. 99-104 (2008).

Lee, J.-H. et al., "Thermionic Emission From Microfabricated Silicon-Carbide Filaments," Proceedings Power MEMS, pp. 149-152 (2009).

Lee, R., "The Outlook for Population Growth," Science, vol. 333, pp. 569-573 (2011).

Lee, Z. et al., "Bimodal microstructure and deformation of cryomilled bulk nanocrystalline Al—7.5Mg alloy," Materials Science and Engineering A, vols. 410-411, pp. 462-467 (2005).

Legros, M. et al., "Microsample tensile testing of nanocrystalline metals," Philosophical Magazine A, vol. 80, No. 4, pp. 1017-1026 (2000).

Leijon, M. et al., "Multiphysics simulation of wave energy to electric energy conversion by permanent magnet linear generator," IEEE Transactions on Energy Conversion, vol. 20, pp. 219-224 (2005).

Lenggoro, I.W. et al., "Nanoparticle Assembly on Patterned "plus/minus" Surfaces From Electrospray of Colloidal Dispersion," Journal of Colloid and Interface Science, vol. 303, pp. 124-130 (2006).

Levine, J.D., "Structural and Electronic Model of Negative Electron Affinity on The Si/Cs/O Surface," Surface Science, vol. 34, pp. 90-107 (1973).

Likharev, Konstantin K., "Single-Electron Devices and Their Applications," Proc. IEEE, vol. 87, pp. 606-632 (1999).

Lin, M.C. et al., "Work functions of cathode surfaces with adsorbed atoms based on ab initio calculations," Journal of Vacuum Science and Technology B, vol. 26, pp. 821-825 (2008).

Lin, Z. et al., "A highly efficient ZnS/CdS@TiO2 photoelectrode for photogenerated cathodic protection of metals," Electrochimica Acta, vol. 55, pp. 8717-8723 (2010).

Lindell, L. et al., "Transparent, Plastic, Low-Work-Function Poly (3,4-ethylenedioxythiophene) Electrodes," Chemistry of Materials, vol. 18, pp. 4246-4252 (2006).

List of Birmingham Technologies Patents or Applications Treated as Related, Apr. 2022.

Lloyd, D.J., "Particle reinforced aluminum and magnesium matrix composites," International Materials Reviews, vol. 39, Issue 1, pp. 1-23 (1994).

Love, J.C. et al., "Self-Assembled Monolayers of Thiolates on Metals as a Form of Nanotechnology," Chemical Reviews, vol. 105, pp. 1103-1169 (2005).

Low, T.S. et al., "Slotless PM motor design for hard disk drives," IEEE Industry Applications Magazine, vol. 3, pp. 43-51 (1997).

Lu, J.-Q., "3-D Hyperintegration and Packaging Technologies for Micro-Nano Systems," Proceedings of the IEEE, vol. 97, pp. 18-30 (2009).

Lucia, U., "Overview on Fuel Cells," Renewable and Sustainable Energy Reviews, vol. 30, pp. 164-169 (2014).

Lund, J.W. et al., "World-Wide Direct Uses of Geothermal Energy 2000", Geothermics, vol. 30, pp. 29-68 (2001).

Luo, Jian et al., "The Role of a Bilayer Interfacial Phase on Liquid Metal Embrittlement," Science, vol. 333, Issue 6050, pp. 1730-1733 (2011).

Olawole, O.C. et al., "Theoretical studies of thermionic conversion of solar energy with graphene as emitter and collector," Journal of Photonics for Energy, vol. 8(1), p. 018001 (2018).

Østlie, K. et al., "Prosthesis use in adult acquired major upper-limb amputees: patterns of wear, prosthetic skills and the actual use of prostheses in activities of daily life," Disability and Rehabilitation: Assistive Technology, vol. 7, p. 479-493 (2012).

Ottman, G.K. et al., "Adaptive piezoelectric energy harvesting circuit for wireless remote power supply," IEEE Transactions on Power Electronics, vol. 17, pp. 669-676 (2002).

Padeletti, L. et al., "Digital technology for cardiac pacing," American Journal of Cardiology, vol. 95, pp. 479-482 (2005).

Paradiso, J.A. et al., "Energy scavenging for mobile and wireless electronics," Pervasive Computing, vol. 4, pp. 18-27 (2005).

Park, H. et al., "A Novel photoelectrochemical method of metal corrosion prevention using a TiO2 solar panel," Journal of Chemical Communications, vol. 3, pp. 281-282 (2001).

Park, Jang-Ung et al., "High-resolution electrohydrodynamic jet printing," Nature Materials, vol. 6, pp. 782-789 (2007).

Park, Jang-Ung et al., "Nanoscale Patterns of Oligonucleotides Formed by Electrohydrodynamic Jet Printing with Applications in Biosensing and Nanomaterials Assembly," Nano Letters, vol. 8, pp. 4210-4216 (2008).

Parker, P. et al., "Myoelectric signal processing for control of powered limb prostheses," Journal of Electromyograhy and Kinesiology, vol. 16, pp. 541-548 (2006).

Paul, S. et al., "Printed circuit axial-flux permanent magnet machines: a comparative analysis of their PCB topologies and performance characteristics," 2018 IEEE International Magnetics Conference (INTERMAG), p. 1 (2018).

Perepezko, J.H., et al., "Amorphization and nanostructure synthesis in Al alloys", Intermetallics 10 (2002) p. 1079-1088.

Petri, R.P. et al., "The military upper extremity amputee," Physical Medicine and Rehabilitation Clinics of North America, vol. 13, pp. 17-43 (2002).

Pi, K. et al., "Electronic Doping and Scattering by Transition Metals on Graphene," Department of Physics and Astronomy, University of California, Riverside CA (2021).

Prada, S. et al., "Work function changes induced by deposition of ultrathin dielectric films on metals: A theoretical analysi," Physical Review B, vol. 78, p. 235423 (2008).

Prieto Rojas, J. et al., "Folding and Stretching a Thermoelectric Generator," Proceedings of the Society of Photo-Optical Instrumentation Engineers, vol. 10639, p. 10639E (2018).

Redko, Mikhail et al., "Design and Synthesis of a Thermally Stable Organic Electride," J. Am. Chem. Soc., vol. 127, No. 35, pp. 12416-12422 (2005).

Romero, E. et al., "Energy scavenging sources for biomedical sensors," Physiological Measurement, vol. 30, pp. R35-R62 (2009).

Roundy, S. et al., "A study of low-level vibrations as a power source for wireless sensor nodes," Computer Communications, vol. 26, pp. 1131-1144 (2003).

Rusu, Paul et al., "Work functions of self-assembled monolayers on metal surfaces by first-principles calculations," Physical Review B, vol. 74, pp. 073414-1-073414-4 (2006).

Saha, C.R. et al., "Electromagnetic generator harvesting energy from human motion," Sensors and Actuators—A: Physical, vol. 147, pp. 248-253 (2008).

Sanders, P.G et al., "Elastic and Tensile Behavior of Nanocrystalline Copper and Palladium," Acta Materialia, vol. 45, No. 10, pp. 4019-4025 (1997).

Sanders, P.G et al., "The strength of nanocrystalline metals with and without flaws," Materials Science Engineering A, vol. 234-236, pp. 77-82 (1997).

(56) References Cited

OTHER PUBLICATIONS

Satterley, C.J. et al., "Electrospray deposition of fullerenes in ultra-high vacuum: in situ scanning tunneling microscopy and photoemission spectroscopy," Nanotechnology, vol. 18, p. 455304 (2007).
Scheible, Dominik V. et al., "Tunable coupled nanomechanical resonators for single-electron transport," New Journal of Physics, vol. 4, pp. 86.1-86.7 (2002).
Schneider, Julian, "Electrohydrodynamic nanoprinting and its applications," Diss. ETH No. 22694 (2015).
Schreiber, Frank, "Structure and growth of self-assembling monolayers," Progress in Surface Science, vol. 65, pp. 151-256 (2000).
Schroeder, H., "Poole-Frenkel-effect as dominating current mechanism in thin oxide films—An illusion?!," Journal of Applied Physics, vol. 117, p. 215103 (2015).
Schultz, A.E. et al., "Neural interfaces for control of upper limb prostheses: the state of the art and future possibilities," PM & R, vol. 3, pp. 55-67 (2011).
Schwede, J.W. et al., "Photon-enhanced thermionic emission for solar concentrator systems," Nature Materials, vol. 9, p. 762-767 (2010).
Scott, R.N. et al., "Myoelectric Prostheses: state of the art," Journal of Medical Engineering and Technology, vol. 12, pp. 143-151 (1988).
Scoville, N. et al., "Thermal Conductivity Reductions in SiGe Via Addition of Nanophase Particles," Materials Research Society Symposium Proceedings, vol. 351, pp. 431-436 (1994).
Sekine, H. et al., "A combined microstructure strengthening analysis of SiC-p/Al metal matrix composites," Composites, vol. 26, pp. 183-188 (1995).
Shakouri, A. et al., "Heterostructure integrated thermionic coolers," Applied. Physics Letters, vol. 71, pp. 1234-1236 (1997).
Shakouri, Ali, "Nanoscale Thermal Transport and Microrefrigerators on a Chip," Proceedings of the IEEE, vol. 94, No. 8, pp. 1613-1638 (2006).
Shen, H. et al., "A low-power circuit for piezoelectric vibration control by synchronized switching on voltage sources," Sensors and Actuators A: Physical, vol. 161, pp. 245-255 (2010).
Shin, H. et al., "Improved electrical performance and transparency of bottom-gate, bottom-contact single-walled carbon nanotube transistors using graphene source/drain electrodes," Journal of Industrial and Engineering Chemistry, vol. 81, pp. 488-495 (2020).
Shockley, William et al., "Detailed Balance Limit of Efficiency of pn Junction Solar Cells," Journal of Applied Physics, vol. 32, pp. 510-519 (1961).
Sindhuja, M. et al., "High Efficiency Graphene Coated Copper Based Thermocells Connected in Series," Frontiers in Physics, vol. 6, Article 35 (2018).
Singh-Miller, N.E. et al., "Surface energies, work functions, and surface relaxations of low-index metallic surfaces from first principles," Physical Review B, vol. 80, p. 235407 (2009).
Snider, D.R. et al., "Variational calculation of the work function for small metal spheres," Solid State Communications, vol. 47, No. 10, pp. 845-849 (1983).
Snyder, G. et al., "Complex thermoelectric materials," Nature Materials, vol. 7, pp. 105-114 (2008).
Sodha, M.S. et al., "Dependence of Fermi energy on size," Journal of Physics D: Applied Physics, vol. 3, No. 2, pp. 139-144 (1970).
Starner, T., "Human-powered wearable computing," IBM Systems Journal, vol. 35, pp. 1-12 (1996).
Starr, M.B. et al., "Coupling of piezoelectric effect with electrochemical processes," Nano Energy, vol. 14, pp. 296-311 (2015).
Stefansson, V., "Estimate of the World Geothermal Potential," Proceedings of the 20th Anniversary Workshop of the Geothermal Training Programme, pp. 111-120 (1998).
Stephanos, Cyril, "Thermoelectronic Power Generation from Solar Radiation and Heat," University of Augsburg, Ph. D. Thesis, Nov. 2012.
Su, L. et al., "All-solid-state electrochromic window of Prussian Blue and electrodeposited WO3 film with PMMA gel electrolyte," Journal of Materials of Chemistry, vol. 8, pp. 85-88 (1998).
Tabesh, A. et al., "Ultra-Low Power Stand-Alone Circuitry for Harvesting Energy from a Micro-Power Piezoelectric Generator," Proceedings of PowerMEMS 2008+ microEMS2008, pp. 289-292 (2008).
Tan, Y.K. et al., "Review of Energy Harvesting Technologies for Sustainable Wireless Sensor Network," National University of Singapore, pp. 15-43 (2010).
Maboudian, R. et al., "Critical Review: Adhesion in surface micromechanical structures," Journal of Vacuum Science and Technology B, vol. 15, pp. 1-20 (1997).
Maboudian, R. et al., "Self-assembled monolayers as anti-stiction coatings for MEMS: characteristics and recent ievelopments," Sensors and Actuators, vol. 82, pp. 219-223 (2000).
Maboudian, R., "Surface processes in MEMS technology," Surface Science Reports, vol. 30, 207-269 (1998).
Magkoev, T.T. et al., "Aluminium oxide ultrathin-film growth on the Mo(110) surface: a work-function strudy," Journal of Physics: Condensed Matter, vol. 13, pp. L655-L661 (2001).
Mahan, G.D. et al., "Multilayer Thermionic Refrigeration," Physical Review Letters, vol. 80, pp. 4016-4019 (1998).
Mahan, G.D., "Thermionic refrigeration," Journal of Applied Physics, vol. 76, No. 7, pp. 4362-4366 (1994).
Mallela, V.S. et al., "Trends in Cardiac Pacemaker Batteries," Indian Pacing Electrophysiology Journal, vol. 4, p. 201-212 (2004).
Maritime Executive, "U.S. Navy Agrees to Stop Cleaning Mothballed Hulls in Puget Sound," The Maritime Executive, Jan. 29, 2020.
Marzari, Nicola et al., "Maximally localized generalized Wannier functions for composite energy bands," Physical Review B, vol. 56, No. 20, pp. 12847-12865 (1997).
Mateu, L. et al., "Review of energy harvesting techniques and applications for microelectronics," Proceedings of SPIE, vol. 5837, pp. 359-373 (2005).
Matsunaga, T. et al., "Electrochemical Prevention of Biofouling," Journal of Electrochemistry, vol. 68, pp. 847-852 (2000).
Matsunaga, T. et al., "Electrochemical sterilization of microbial cells," Bioelectrochemistry and Bioenergetics, vol. 13, pp. 393-400 (1984).
Mayr, S.G. et al., "Stabilization of Cu nanostructures by grain boundary doping with Bi: Experiment versus molecular dynamics simulation," Physical Review B, vol. 76, p. 024111 (2007).
Mayrhofer, R.D. et al., "Stochastic thermodynamic cycles of a mesoscopic thermoelectric engine," Physical Review B, vol. 103, p. 075404 (2021).
McCandlish L.E. et al., "Chemical processing of nanophase WC-Co composite powders," Materials Science and Technology, vol. 6, Issue 10, pp. 953-957 (1990).
McFarland, L.V. et al., "Unilateral upper-limb loss: Satisfaction and prosthetic-device use in veterans and service members from Vietnam and OIF/OEF conflicts," Journal of Rehabilitation Research & Development, vol. 47, pp. 299-316 (2010).
McKendry, P., "Energy production from biomass (part 1): overview of biomass," Bioresource Technology, vol. 83, p. 37-46 (2002).
Miller, L.A. et al., "Control of a six degree-of-freedom prosthetic arm after targeted muscle reinnervation surgery," Archives of Physical Medicine and Rehabilitation, vol. 89, pp. 2057-2065 (2008).
Millett, Paul C. et al., "Stabilizing nanocrystalline materials with dopants," Acta Materialia, vol. 55, pp. 2329-2336 (2007).
Modinos, A., "Theory of Thermionic Emission," Surface Science, vol. 115, pp. 469-500 (1982).
Moon, Kyoung II et al., "A study of the microstructure of nanocrystalline Al—Ti alloys synthesized by ball milling in a hydrogen atmosphere and hot extrusion," Journal of Alloys Compounds, vol. 291, pp. 312-321 (1999).
Morris, J.E., "Nanopackaging: Nanotechnologies and Electronics Packaging," Springer-Verlag, pp. 93-107 (2008).
Mortensen, A. et al., "Metal Matrix Composites," Annual Review of Materials Research, vol. 40, pp. 243-270 (2010).
Mortimer, R.J. et al., "Electrochromic organic and polymeric materials for display applications," Displays, vol. 27, pp. 2-18 (2006).

(56) References Cited

OTHER PUBLICATIONS

Muller-Steinhagen, Hans et al., "Concentrating solar power," Ingenia, pp. 1-9 (2004).
Murata, Kazuhiro, "Super-fine ink-jet printing for nanotechnology," Proceedings International Conference on MEMS, NANO and Smart Systems, pp. 346-349 (2003).
Murray, Royce W., "Nanoelectrochemistry: Metal Nanoparticles, Nanoelectrodes, and Nanopores," Chemical Reviews, vol. 108, No. 7, pp. 2688-2720 (2008).
Musho, T.D. et al., "Quantum simulation of thermionic emission from diamond films," Journal of Vacuum Science and Technology B, vol. 31, p. 021401 (2013).
Nabarro, F.R.N., "The theory of solution hardening," The Philosophical Magazine: A Journal of Theoretical Experimental and Applied Physics, vol. 35, pp. 613-622 (1977).
Nan, C.W. et al., "The Influence of Particle Size and Particle Fracture on the Elastic/Plastic Deformation of Metal Matrix Composites," Acta Materialia, vol. 44, No. 9, pp. 3801-3811 (1996).
Nanda, O. et al., "Self-Powered Electrochromic Window using Green Electrolyte," AIP Advances, vol. 8, p. 095117 (2018).
Natan, A. et al., "Computing surface dipoles and potentials of self-assembled monolayers from first principles," Applied Surface Science, vol. 252, pp. 7608-7613 (2006).
Nechibvute, A. et al., "Piezoelectric energy harvesting devices: an alternative energy source for wireless sensors," Smart Materials Research, vol. 2012, pp. 1-13 (2012).
Neethu, S. et al., "High-speed coreless axial-flux permanent-magnet motor with printed circuit board winding," IEEE Transactions on Industry Applications, vol. 55, pp. 1954-1962 (2019).
Neugebauer, J. et al., "Adsorbate-substrate and adsorbate-adsorbate interactions of Na and K adlayers on Al (111)," Physical Review B, vol. 46, pp. 16067-16080 (1992).
Neuzner, J., "The mismatch between patient life expectancy and the service life of implantable devices in current cardioverter-defibrillator therapy: a call for larger device batteries," Clinical Research in Cardiology, vol. 104, p. 456-460 (2015).
Nguyen, Hoang M. et al., "Thermionic emission via a nanofluid for direct electrification from low-grade heat energy," Nano Energy, vol. 49, pp. 172-178 (2018).
Nichols, M.H., "The Thermionic Constants of Tungsten as a Function of Crystallographic Direction," Physical Review, vol. 57, pp. 297-306 (1940).
Nielsen-Lonn, M. et al., "Self-powered micro-watt level piezoelectric energy harvesting system with wide input voltage range," Analog Integrated Circuits and Signal Processing, vol. 98, pp. 441-451 (2019).
Nojeh, A., "Thermionic Energy Conversion: Fundamentals and Recent Progress Enabled by Nanotechnology," 19th International Conference on Micro and Nanotechnology for Power Generation and Energy Conversion Applications (2019).
Notice of Allowance for U.S. Appl. No. 16/745,071, dated Oct. 2021.
Obraztsov, Alexander et al., "Cold and Laser Stimulated Electron Emission from Nanocarbons," Journal Nanoelectronics and Optoelectronics, vol. 4, pp. 1-13 (2009).
O'Dwyer, M.F. et al., "The effect of barrier shape on thermionic refrigerator performance," Proceedings of SPIE, vol. 6035, p. 60350R (2006).
O'dwyer, M.F. et al., "The Effect of the Electron Energy Spectrum on Electronic Efficiency and Power in Thermionic and Thermoelectric Devices," International Conference on Thermoelectrics, p. 456 (2005).
Office Action for U.S. Appl. No. 16/284,967, dated Jul. 2020.
Office Action for U.S. Appl. No. 16/284,979, dated Sep. 2020.
Office Action for U.S. Appl. No. 16/416,849, dated Nov. 2020.
Office Action for U.S. Appl. No. 16/582,545, dated Jun. 2021.
Office Action for U.S. Appl. No. 17/483,916, dated Nov. 23, 2021.
Office Action for U.S. Appl. No. 16/582,545, dated Nov. 30, 2021.

Dyer, A.L. et al., "A Vertically Integrated Solar-Powered Electrochromic Window for Energy Efficient Buildings," Advanced Materials, vol. 26, pp. 4895-4900 (2014).
Edeer, D. et al., "Upper limb prostheses—a review of the literature with a focus on myoelectric hands," Richmond, BC: WorksafeBC Evidence-Based Practice Group, (2011).
Elaskri, A. et al., "3D Printed Electric Motors as a Step Towards Self-Replicating Machines," Virtual Conference Oct. 19-23, 2020.
Enikov, E.T. et al., "Analysis of Nanometer Vacuum Gap Formation in Thermo-tunneling Devices," Nanotechnology, vol. 19, p. 075703 (2008).
Fall, C.J. et al., "Deriving accurate work functions from thin-slab calculations," Journal of Physics: Condensed Matter, vol. 11 2689-2696 (1999).
Fall, C.J. et al., "Theorectical maps of work-function anisotropies," Physical Review B, vol. 65, p. 045401 (2001).
Fernandez De La Mora, J. et al., "Generation of submicron monodisperse aerosols by electrosprays," Journal of Aerosol Science, vol. 21, Supplement 1, pp. S673-S676 (1990).
Fisher, T.S. et al., "Thermal and Electrical Energy Transport and Conversion in Nanoscale Electron Field Emission Processes," Journal of Heat Transfer, vol. 124, pp. 954-962 (2002).
Fomenko, V.S., "Handbook of Thermionic Properties, Electronic Work Functions and Richardson Constants of Elements and Compounds," Plenum Press Data Division, New York, pp. 126-137 (1966).
Francois, G. et al., "Influence of eddy current losses in the optimization of linear coreless BLDC motors with PCB windings," 2019 12th International Symposium on Linear Drives for Industry Applications (LDIA), pp. 1-6 (2019).
Francois, G. et al., "Numerical investigation of eddy current losses in airgap PCB windings of slotless BLDC motors," 2018 21st International Conference on Electrical Machines and Systems (ICEMS), pp. 2702-2708 (2018).
Fu, Xinyong et al., "Realization of Maxwell's Hypothesis," Shanghai Jiao Tong University (2008).
Gaine, W.J. et al., "Upper Limb Traumatic Amputees: Review of prosthetic use," Journal of Hand Surgery (British and European Volume), vol. 22B, pp. 73-76 (1997).
Gambetta, D. et al., "Designing printed circuit stators for brushless permanent magnet motors," IET Electric Power Applications, vol. 3, pp. 482-490 (2009).
Gammaitoni, L. et al., "Nonlinear oscillators for vibration energy harvesting," Applied Physics Letters, vol. 94, p. 164102 (2009).
Gertsman, V. Y. et al., "Deformation behavior of ultrafine-grained materials," Materials Science Forum, vols. 225-227, pp. 739-744 (1996).
Giordano, L. et al., "Tuning the surface metal work function by deposition of ultrathin oxide films: Density functional calculations," Physical Review B, vol. 73, p. 045414 (2005).
Go, David B. et al., "Thermionic Energy Conversion in the Twenty-first Century: Advances and Opportunities for Space and Terrestrial Applications," Frontiers in Mechanical Engineering, vol. 3 (2017).
Green, Nicolas G. et al., "Dielectrophoresis of Submicrometer Latex Spheres. 1. Experimental Results," Journal of Phsysical Chemistry B, vol. 103, pp. 41-50 (1999).
Gudmundson, Peter, "A unified treatment of strain gradient plasticity," Journal of the Mechanics and Physics of Solids, vol. 52, pp. 1379-1406 (2004).
Guyomar, D. et al., "Recent progress in piezoelectric conversion and energy harvesting using nonlinear electronic interfaces and issues in small scale implementation," Micromachines, vol. 2, pp. 274-294 (2011).
Gyftopoulos, E.P. et al., "Work Function Variation of Metals Coated by Metallic Films," Journal of Applied Physics, vol. 33, pp. 67-73 (1962).
Haas, G.A. et al., "Interatomic Auger Analysis of the Oxidation of Thin Ba Films," Applications of Surface Science, vol. 16, pp. 139-162 (1983).
Hafner, J. et al., "Toward Computational Materials Design: The Impact of Density Functional Theory on Materials Research," MRS Bulletin, vol. 31, pp. 659-668 (2006).

(56) References Cited

OTHER PUBLICATIONS

Hambling, D., "DARPA Building An Energy-Harvesting Submarine That Never Runs Out Of Power," Forbes, Feb. 12, 2021.
Harne, R.L. et al., "A review of the recent research on vibration energy harvesting via bistable systems," Smart Materials and Structures, vol. 22, p. 023001 (2013).
Hatsopoulos, G.N. et al., "Thermionic Energy Conversion vol. I: Process and Devices," The MIT Press, Cambridge, MA, pp. 5-37 (1973).
Hehn, T. et al., "A CMOS Integrated Interface for Piezoelectric Generators," Proceedings of PowerMEMS 2008+ microEMS2008, pp. 457-460 (2008).
Helmenstine, A.M., "Why Batteries Discharge More Quickly in Cold Weather." ThoughtCo, (2020).
Hentschel, T. et al., "Nanocrytsalline Ni-3.6 at.% P and its Transformation Sequence Studied by Atom-Probe Field-Ion Microscopy," Acta Materialia, vol. 48, pp. 933-941 (2000).
Hishinuma, Y. et al., "Refrigeration by combined tunneling and thermionic emission in vacuum: use of nanometer scale design," Applied Physics Letters, vol. 78, No. 17, pp. 2572-2574 (2001).
Hishinuma, Yoshikazu et al., "Measurements of cooling by room-temperature thermionic emission across a nanometer gap," Journal of Applied Physics, vol. 94, No. 7, p. 4690 (2003).
Ho, P-H et al., "Self-Encapsulated Doping of n-Type Graphene Transistors with Extended Air Stability," ACS Nano, vol. 6, pp. 6215-6221 (2012).
Horlbeck, F.W. et al., "Real-World Data on the Lifespan of Implantable Cardioverter-Defibrillators Depending on Manufacturers and the Amount of Ventricular Pacing," Journal of Cardiovascular Electrophysiology, vol. 23, pp. 1336-1342 (2012).
Houston, J.M., "Theoretical Efficiency of the Thermionic Energy Converter," Journal of Applied Physics, vol. 30, pp. 481-487 (1959).
Hudak, N.S. et al., "Small-scale energy harvesting through thermoelectric, vibration, and radiofrequency power conversion," Journal of Applied Physics, vol. 103, p. 101301 (2008).
Humphrey, T.E. et al., "Power optimization in thermionic devices," Journal of Physics D: Applied Physics, vol. 38, pp. 2051-2054 (2005).
Incropera, F.P. et al., "Fundamentals of Heat and Mass Transfer, 6th Edition," John Wiley & Sons, pp. 2-42 (2007).
International Search Report for PCT/US2020/019230, dated Jun. 2020.
International Search Report for PCT/US2020/019232, dated Jun. 2020.
International Search Report for PCT/US2020/033528, dated Aug. 2020.
International Search Report for PCT/US2020/052506, dated Dec. 2020.
International Search Report for PCT/US2020/052507, dated Dec. 2020.
International Search Report for PCT/US2020/052508, dated Dec. 2020.
International Search Report for PCT/US2021/029351, dated Jul. 2021.
International Search Report for PCT/US2021/037166, dated Sep. 2021.
International Search Report for PCT/US2021/021676, dated May 2021.
International Search Report for PCT/US2021/050831, dated Jan. 2022.
Ioffe, A.F., "Semiconductor Thermoelements and Thermoelectric Cooling Infosearch," Infosearch Ltd., 1957.
Jaliel, G. et al., "Experimental realization of a quantum dot energy harvester," Physical Review Letters, vol. 123, p. 117701 (2019).
Alapatt, G.F. et al., "Observation of the Poole-Frenkel effect in Tantalum Polymer capacitors," Proceedings of the IEEE SoutheastCon 2010, pp. 498-501 (2010).
Alhuwaidi, S.A., "3D Modeling Analysis, and Design of a Traveling-Wave Tube Using a Modified Ring-Bar Structure with Rectangular Transmission Lines Geometry," Dissertation submitted to the University of Colorado Colorado Springs (2017).
Amar, A.B. et al., "Power Approaches for Implantable Medical Devices," Sensors, vol. 15, pp. 28889-28914 (2015).
Anton, S.R. et al., "A review of power harvesting using piezoelectric materials (2003-2006)," Smart Materials and Structures, vol. 16, pp. R1-R21 (2007).
Arnold, D.P. et al., "Review of Microscale Magnetic Power Generation," IEEE Transactions on Magnetics, vol. 43, pp. 3940-3951 (2007).
ASTM, "StandardTest Method for Linear Thermal Expansion of Solid Materials With a Push-Rod Dilatometer," Designation E228 (2011).
Azens, A. et al., "Electrochromic devices embodying W oxide/Ni oxide tandem films," Journal of Applied Physics, vol. 89, pp. 7885-7887 (2001).
Bai, Y. et al., "Washable Multilayer Triboelectric Air Filter for Efficient Particulate Matter PM2.5 Removal," Advanced Functional Materials, p. 1706680 (2018).
Baram, M. et al., "Nanometer-Thick Equilibrium Films: The Interface Between Thermodynamics and Atomistics," Science, vol. 332, Issue 6026, pp. 206-209 (2011).
Bassani, J.L., "Incompatibility and a simple gradient theory of plasticity," Journal of Mechanics and Physics of Solids vol. 49, pp. 1983-1996 (2001).
Battezzati, L. et al., "Solid state reactions in Al/Ni alternate foils induced by cold rolling and annealing," Acta Materialia, vol. 47, Issue 6, pp. 1901-1914 (1999).
Baudart, F. et al., "Shape optimization of flexible PCB slotless windings in BLDC machines," 2013 International Conference on Electrical Machines and Systems (ICEMS), pp. 943-948 (2013).
Bechinger, C. et al., "Development of a new self-powered electrochromic device for light modulation without external power supply," Solar Energy Materials and Solar Cells, vol. 54, pp. 405-4104 (1998).
Behrend, C. et al., "Update on Advances in Upper Extremity Prosthetics," Journal of Hand Surgery, vol. 36, pp. 1711-1717(2011).
Bell, Lon E., "Cooling, heating, generating power, and recovering waste heat with thermoelectric systems," Science, vol. 321, pp. 1457-1461 (2008).
Benedict, Lorin X. et al., "Static polarizabilities of single-wall carbon nanotubes," Physical Review B, vol. 52, pp. 8541-8549 (1995).
Bergman, W. et al., "Electric Air Filtration: Theory, Laboratory Studies, Hardware Development, and Field Evaluations," Lawrence Livermore Laboratory (1982).
Bhadrachalam, Pradeep et al., "Energy-filtered cold electron transport at room temperature," Nature Communications, Sep. 10, 2014.
Billock, J.N., "Upper limb prosthetic terminal devices: hands versus hooks," Clinical Prosthetics and Orthotics, vol. 10, pp. 57-65 (1986).
Birmingham, J.G., "DEP-Enhanced Micro-Injector Array for Liquid Fuel Atomizer," Final Report for U.S. Army SBIR 02.2 N02-148 (2001).
Birmingham, J.G., "E-Field Micro-Injector Array Liquid Fuel Atomizer," Final Report for NASA SBIR Phase I: NASA 01.1-A8.02 (2002).
Birmingham, Joseph, "Printed Self-Powered Miniature Air Sampling Sensors," Sensors and Transducers, vol. 214, pp. 1-11 (2017).
Brezonik, Patrick L. et al., "Water Chemistry: An Introduction to the Chemistry of Natural and Engineered Aquatic Systems," Oxford University Press, Inc., pp. 170-175 (2011).
Brodie, I. et al., "Impregnated Barium Dispenser Cathodes Containing Strontium or Calcium Oxide," Journal of Applied Physics, vol. 27, pp. 417-418 (1956).
Brodie, I. et al., "Secondary electron emission from barium dispenser cathodes," British Journal of Applied Physics, vol. 8, pp. 202-204 (1957).
Brown, D.R. et al. "The Prospects of Alternatives to Vapor Compression Technology for Space Cooling and Food Refrigeration Applications," Prepared for the U.S. Department of Energy under Contract DE-AC05-76RL01830 Mar. 2010.

(56) References Cited

OTHER PUBLICATIONS

Brunekreef, B. et al., "Air pollution and health," The Lancet, vol. 360, pp. 1233-1242 (2002).
Buchli, B. et al., "Battery state-of-charge approximation for energy harvesting embedded systems," Computer Engineering and Networks Laboratory, Zurich, Switzeriand (2014).
Buckle, J.R. et al., "Autonomous Underwater Vehicle Thermoelectric Power Generation," Journal of Electronic Materials, vol. 42, pp. 2214-2220 (2013).
Campbell, Matthew F., et al., Progress Toward High Power Output in Thermionic Energy Converters, Advanced Science, vol. 8, No. 9, May 1, 2021.
Casiday, R. et al., "Bonds, Bands, and Doping: How do LEDs work?" Periodic Trends Experiment, Deptartment of Chemistry, Washington University, St. Louis, Mo. (2007).
Chattopadhyay, Debjit et al., "Complete elimination of metal catalysts from single wall carbon nanotubes," Carbon, vol. 40, pp. 985-988 (2002).
Chen, S. et al., "Self-Powered cleaning of air pollution by wind driven triboelectric nanogenerator," Nano Energy, vol. 14, pp. 217-225 (2015).
Chen, Zhihong et al., "An Integrated Logic Circuit Assembled on a Single Carbon Nanotube," Science, vol. 311, p. 1735 (2006).
Childress, D.S., "Historical aspects of powered limb prostheses," Clinical Prosthetics and Orthotics, vol. 9, pp. 2-13 (1985).
Choi, S.U.S. et al., "Enhancing Thermal Conductivity of Fluids with Nanoparticles," Energy Technology Division and Materials Science Division Argonne National Laboratory, Jan. 1995.
Chou, S.H. et al.,"An orbital-overlap model for minimal work functions of cesiated metal surfaces," Journal of Physics Condensed Matter, vol. 24, p. 445007 (2012).
Chu, S. et al., "Opportunities and Challenges for a Sustainable Energy Future," Nature, vol. 488, pp. 294-303 (2012).
Chung, M.S. et al., "Energy exchange processes in electron emission at high fields and temperatures," Journal of Vacuum Science and Technology B, vol. 12, pp. 727-736 (1994).
Committee on Thermionic Research and Technology et al., "Thermionics: Quo Vadis? An Assessment of the DTRA's Advanced Thermionics Research and Development Program," National Academy Press (2001).
Corr, D. et al., "Coloured electrochromic "paper-quality" displays based on modified mesoporous electrodes," Solid State Ionics, vol. 165, pp. 315-321 (2003).
Cronin, J.L., "Modern dispenser cathodes," IEE Proc., vol. 128, Pt. 1, No. 1, pp. 19-32 (1981).
Cupertino, F.p et al., "Experimental evaluation of current carrying capacity of printed circuit stator coils," IECON 2013-39th Annual Conference of the IEEE Industrial Electronics Society, pp. 2810-2815 (2013).
Curzon, F.L. et al., "Efficiency of a Carnot engine at maximum power output," American Journal of Physics, vol. 43, pp. 22-24 (1975).
Cutler, P.H. et al., "A new model for the replacement process in electron emission at high fields and temperatures," Applied Surface Science, vol. 76-77, pp. 1-6 (1994).
Daniel, Marie-Christine et al., "Gold Nanoparticles: Assembly, Supramolecular Chemistry, Quantum-Size-Related Properties, and Applications toward Biology, Catalysis, and Nanotechnology," Chemical Reviews, vol. 104, No. 1, pp. 293-346 (2004).
Darling, K.A. et al., "Thermal stability of nanocrystalline Fe—Zr alloys," Materials Science and Engineering A, vol. 527, pp. 3572-3580 (2010).
Datta, A. et al., "Piezoelectric nylon-11 nanowire arrays grown by template wetting for vibrational energy harvesting applications," Advanced Functional Materials, vol. 27, p. 1604262 (2017).
Datta, S., "Electronic Transport in Mesoscopic Systems," Cambridge University Press, New York, pp. 246-275 (1995).
De Juan, L. et al., "Charge and size distribution of electrospray drops," Journal of Colloid Interface Science, vol. 186, No. 2, pp. 280-293 (1997).
Deng et al., "Digital electrospray for controlled deposition," Review of Scientific Instruments, vol. 81, pp. 035114-1-035114-6 (2010).
Deng, Weiwei et al., "Influence of space charge on the scale-up of multiplexed electrosprays," Aerosol Science 38, pp. 1062-1078 (2007).
Department of Energy, "Hydrogen Production: Electrolysis," https://www.energy.gov/eere/fuelcells/hydrogen-production-electrolysis (Accessed on Jun. 2, 2021).
Detor, Andrew J. et al., "Grain boundary segregation, chemical ordering and stability of nanocrystalline alloys: Atomistic computer simulations in the Ni-W system," Acta Materialia, vol. 55, pp. 4221-4232 (2007).
Di Stefano, R. et al., "Optimal feeding of an etched winding mini-motor," ISIE 1997 Proceeding of the IEEE International Symposium on Industrial Electronics, pp. 474-479 (1997).
Dicken, J. et al., "Power-extraction circuits for piezoelectric energy harvesters in miniature and low-power applications," IEEE Transactions on Power Electronics, vol. 27, pp. 4514-4529 (2012).
Dillingham, T.R. et al., "Limb Amputation and Limb Deficiency: Epidemiology and Recent Trends in the United States," Southern Medical Journal, vol. 95, pp. 875-883 (2002).
Dillner, U., "The effect of thermotunneling on the thermoelectric figure of merit," Energy Conversion and Management, vol. 49, No. 12, pp. 3409-3416 (2008).
Dillon, A.C. et al., "A Simple and Complete Purification of Single-Walled Carbon Nanotube Materials," Advanced Materials, vol. 11, pp. 1354-1358 (1999).
Dimaki, Maria et al., "Frequency dependence of the structure and electrical behaviour of carbon nanotube networks assembled by dielectrophoresis," Nanotechnology, vol. 16, pp. 759-763 (2005).
Dimaki, Maria et al., "Single and multiwalled carbon nanotube networks and bundles assembled on microelectrodes," Proceedings of the Institution of Mechanical Engineers, Part N: Journal of Nanoengineering and Nanosystems, vol. 218, pp. 17-23 (2005).
Dinda, G.P. et al., "Synthesis of bulk nanostructured Ni, Ti and Zr by repeated cold-rolling," Scripta Materialia, vol. 52, Issue 7, pp. 577-582 (2005).
Dionne, J.A. et al., "Silicon-Based Plasmonics for On-Chip Photonics," IEEE Journal of Selected Topics in Quantum Electronics, vol. 16, pp. 295-306 (2010).
Dissanayake, D.M.N.M. et al., "Chemical-free n-type and p-type multilayer-graphene transistors," Applied Physics Letters, vol. 109, p. 053110 (2016).
Doherty, R. et al., "A New Approach to Quantify Reserve Demand in Systems With Significant Installed Wind Capacity," IEEE Transactions on Power Systems, vol. 20, pp. 587-595 (2005).
Dresselhaus, M.S. et al., "Alternative Energy Technologies," Nature, vol. 414, pp. 332-337 (2001).
Dresselhaus, M.S. et al., "New Directions for Low-Dimensional Thermoelectric Materials," Advanced Materials, vol. 19, pp. 1043-1053 (2007).
Notice of Allowance, U.S. Appl. No. 17/389,664, dated Jan. 19, 2023.
Office Action, U.S. Appl. No. 16/857,308, dated Jan. 6, 2023.
International Preliminary Examination Report on Patentability, PCT/US2021/037166, dated Dec. 30, 2022.
Notice of Allowance, U.S. Appl. No. 17/359,729, dated Nov. 16, 2022.
Office Action, U.S. Appl. No. 16/817,112, dated Oct. 26, 2022.
Office Action, U.S. Appl. No. 16/817,122, dated Oct. 24, 2022.
Office Action, U.S. Appl. No. 16/582,541, dated Oct. 13, 2022.
Office Action, U.S. Appl. No. 17/088,112, dated Sep. 13, 2022.
Office Action, U.S. Appl. No. 16/582,535, dated Aug. 31, 2022.
Office Action, U.S. Appl. No. 16/880,189, dated Aug. 10, 2022.

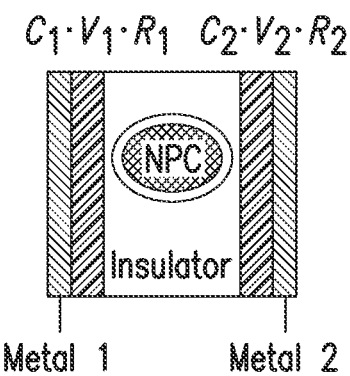
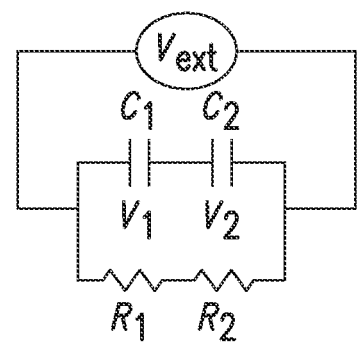
FIG.7A　　　　　　　FIG.7B
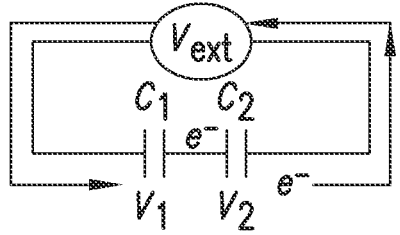
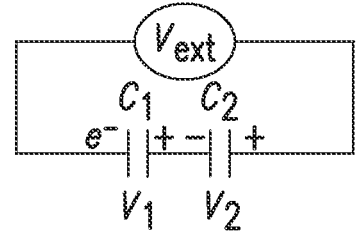
FIG.7C

NANOFLUID CONTACT POTENTIAL DIFFERENCE BATTERY

CROSS REFERENCE TO RELATED APPLICATION(S)

This application is a continuation of U.S. patent application Ser. No. 16/745,071, filed Jan. 16, 2020, now U.S. Pat. No. 11,251,477, which is a divisional of U.S. patent application Ser. No. 14/179,930 filed on Feb. 13, 2014, now U.S. Pat. No. 10,559,864, priority to each of which is claimed and the complete disclosures of which are hereby incorporated by reference.

FIELD OF THE INVENTION

The present invention relates to thermal power generators and more particularly is directed to contact potential difference (CPD) batteries.

BACKGROUND

Numerous battery technologies are well-developed and utilized in a variety of consumer and industrial applications, including for example solid state batteries, fuel cells, and conventional electrochemical systems. These systems, however, all suffer from relatively short terminal life cycles or require recharging at frequent intervals. Further, these systems are often incompatible with electronic systems causing corrosion events and erratic current output to a system, and require external recharging after the charge is depleted.

Electrochemical Batteries

It is well-known in the art of electrical power generation and storage how to construct a battery of alternating plates of dissimilar materials immersed in an electrolyte (a compound that ionizes when dissolved in suitable ionizing solvents such as water), such electrochemical battery being charged by the impression of an electric current, and being discharged by the passage of current through an external load. Such prior art batteries may be constructed of many different plate materials and utilize different electrolytes. The most common are the lead-acid storage battery for the automotive industry, for example, for starting the engine and the lithium-ion battery commonly utilized in small appliances.

The word "battery", as used in this context, pertains to one or a connected set of similar units composed of electrode pairs or cells acting as an electrical energy source. Electric power cells provide self-contained sources of electrical energy for driving external loads. Chemical batteries are a common example of practical electric power cells, in that they are relatively inexpensive to produce and capable of supplying a reasonably high energy output, even though it may be for a relatively short period of time. These batteries are effectively employed in a large variety of applications and environments, which can range in requirements from a very large current demand over a short period of time, such as a heavy-duty fork lift, to a small current demand over a long period of time, such as a wristwatch. While chemical batteries are very effective at providing the power needs of such devices, the size and durational requirements sometimes associated with microelectronic devices are not always compatible with the employment of chemical batteries. One example of a microelectronic device possibly requiring a compact, long-life, low-current, battery is a low power electronic sensor which is installed for long-term unattended operation in an inaccessible location. Another example of a microelectronic device possibly requiring a compact, long-life, minimal power draw, is a nonvolatile memory circuit of a compact computing device.

The amount of energy supplied by chemical batteries is directly related to the mass of reactive materials incorporated in the chemical batteries. This characteristic can result in the size of the chemical battery being much larger than its load. Even a chemical battery in an electronic wrist-watch is usually much larger in size and heavier relative to the microchip circuitry that drives the watch. It is therefore desirable to provide an extremely compact battery that can fit into a very small space, and preferably one which can also provide many years of uninterrupted service.

Nuclear Batteries

Nuclear batteries in the literature have focused on supplying small amounts of power over a long period of time. A nuclear battery, also known as an atomic battery, refers to a battery in which the source of energy emanates from the nucleus of atoms. The nucleus processes that spawn energy include the fission of the nucleus, fusion of the nucleus, or the radioactive decay of the nucleus. A nuclear battery uses the particle from the radioactive gas (or solid) that collides with molecules of gas (solid) to create negative and positive ions, which move to opposite electrodes. The theoretical voltage on the cell is determined by the difference in work functions of the two electrode metals. In essence, one type of nuclear battery is comprised of a radioactive source and one or more collector electrodes for collecting charged particle rays from the source. The efficiency of this type of nuclear battery is low at small voltages and with currently known radioisotopes can have a reasonable efficiency only in the region between 5 and 500 kilovolts. This high voltage eliminates many applications where the relatively small currents generated can be used. A nuclear battery (described in U.S. Pat. No. 2,876,368 A. Thomas) utilizes the field produced by the contact potential difference (CPD) between the two electrodes (formed of dissimilar metals) to collect the ionization produced by alpha (a) or Beta (($) radiations in a gas separating the electrodes. The charge created in the dielectric between electrode collectors generates current through the load resistance. The maximum efficiency of this type of nuclear battery device is the ratio of the CPD (in volts) to twice the average energy (in electron volts) lost by the radiation per ion pair formed. The maximum efficiency based upon known constants among the metallic elements is about 5%. Moreover, since the CPD among the elements is only about 3 volts, a large number of CPD devices are required to obtain several hundred volts of electromotive force in the gaseous type of nuclear battery.

Nuclear batteries include the combination of technologies such as photovoltaic batteries (wherein nuclear radiation energy is first converted into electromagnetic radiation, typically by irradiating a phosphorescent material and then exposing a semiconductor p-n junction to electromagnetic radiation to produce low voltage electrical current) and thermoelectric batteries (in which the nuclear radiation is converted into thermal energy that in turn is converted to electrical energy by means of the Seebeck effect or thermoelectric conversion) [U.S. Pat. Nos. 4,628,143, 4,900,368, and 5,008,579]. Tritium decay beta particles (embedded as the radioactive source) traverse a semiconductor junction losing energy to the formation of electron-hole pairs and Bremsstrahlung radiation (U.S. Pat. No. 5,606,213 N. Kherani et. al. 1997).

Nuclear batteries have not made substantial inroads into applications being served by chemical batteries. A number of reasons can be identified for limited acceptance of nuclear batteries including the inefficiency of the technology and the need to shield the user from nuclear sources that generates the electrical energy. Also, internal shielding is needed in certain designs to ensure that beta particles (electrons) do not reach the circuitry itself, in devices where such electrons would interfere with the electronic operation of the integrated circuit. Over time, the high energy source can damage cell components that further reduce efficiency. Disposal can be a problem for devices using relatively high energy radioactive sources. Thus, to meet a given energy demand, the inefficiency of the nuclear battery would require a sufficient mass and size to achieve the usable output, and the shielding necessitated by radioactive sources would further exacerbate this problem.

Thermal Harvesting Technologies: Thermionic Converters and Thermoelectric Generators Thermionic generators were first proposed in 1915, but many of the theoretical problems that existed at the inception of the idea persist today. Thermionic generators convert heat energy to electrical energy by an emission of electrons from a heated emitter electrode. The electrons flow from the emitter electrode, across an inter-electrode gap, to a collector electrode through an external load, and return back to the emitter electrode, thereby converting heat to electrical energy. Historically, voltages produced are low, and the high temperature required to produce adequate current (greater than 1500° K) has produced numerous problems in maintaining the devices, including the unintended transfer of heat from the hot emitter electrode to the colder collector electrode. Practical thermionic conversion was demonstrated in which efficiencies of 5-10% were reached at power densities of 3-10 W/cm². Generally, such efficiencies and power densities were not sufficient to be financially competitive in the energy marketplace, thus reducing the application of such devices. Furthermore, such thermionic devices were too large for use as miniaturized electrical power sources as discussed by Marshal [U.S. Pat. No. 6,774,532]. Another problem is described by Edelson [U.S. Pat. No. 5,994,638], "space-charge effect" results when the accumulation of negative charge in the cloud of electrons between the two electrodes deters the movement of other electrons towards the collector electrode. Edelson cites two well-explored methods for mitigating the space-charge effect: (1) reducing the spacing between electrodes to the order of microns, or (2) introducing positive ions into the electron cloud in front of the emitter electrode that generally consists of filling the inter-electrode gap with an ionized gas, typically cesium vapor. Utilization of cesium vapor results in a space charge neutralization, (effectively eliminating the detrimental deterrence of electron flow) and the decreasing of the work function of the device. Cesium reduces the work function by adsorbing onto emitter and collector surfaces to cause greater electron flow rates.

New materials with low work functions disclosed herein are critical because these materials dramatically improve the efficiency of thermionic energy converters. The efficiency limit of thermionic energy converters depends very strongly on the work function of the collector (anode), as shown in FIG. 1. For a given anode temperature, the optimal work function of the anode is approximately $T_{anode}/(700° K)$, expressed in eV [Hatsopoulos 1973]. For example, for anodes rejecting heat near room temperature, the optimal anode work function is approximately 0.5 eV. Materials with such low work functions have not previously been discovered and therefore earlier thermionic converters typically use the anodes with the lowest work functions available. In practice, most thermionic converters have used cesiated tungsten anodes with work functions on the order of 1.5 eV, which means that traditional thermionic converters could have competitive efficiencies only at heat source temperatures above 1500 K (see FIG. 1). The lack of materials with lower work functions and the associated high operating temperatures were the main challenges for thermionic converters in the past, explaining both their high cost and limited applicability.

Since there is no known fundamental limit on how low a work function of a specially engineered surface can be, experimentation over the last few decades has produced steady albeit small improvements in lowest-work-function surfaces and their stability. The lowest work functions reported in the literature are currently on the order of 1 eV, but most of these surfaces require an ultra-high-vacuum (UHV) environment and are therefore not suitable for energy conversion applications. New materials that have work functions in the 0.5-1.0 eV range and are stable can dramatically increase the efficiency of all thermionic energy converters. Work function reduction opens up new applications for thermionic converters, such as heat harvesting at moderate temperatures (~100° C.) in residential combined heat and power systems and integrated harvesting of energy from electronic devices. Because thermionic converters have no mechanical moving parts, they produce low noise, and require little maintenance, providing inherent advantages over the mechanical heat engines currently used for energy harvesting systems.

FIG. 1 shows the calculated efficiency limit for a thermionic energy converter as a function of the cathode temperature for three values of the collector (anode) work function: 1.5, 1.0, and 0.5 eV (based on [Hatsopoulos 1973]). Thermoelectric power generation presents a way to harvest available waste heat and convert this thermal energy into electricity. Thermoelectric power generation requires the attachment of one electrode to a different electrode where they experience a temperature gradient. The efficiency of thermoelectric materials is described by a dimensionless figure of merit (ZT) that represents the conversion efficiencies from thermal to electrical energy. For comparison, the dashed curves show the Carnot efficiency limit and the efficiency limits for a thermoelectric converter with a figure of merit of ZT=2, which roughly corresponds to the best existing thermoelectric materials, and ZT=10, which is much better than the current state of the art. The heat sink is assumed to be at room temperature (300° K) in all cases.

SUMMARY

The present invention is directed generally to an ultra-long life self-charging battery and more particularly is directed to a contact potential difference (CPD) battery comprising a plurality of nanofluid CPD cells. Ionization in a nanofluid CPD cell is provided by electron pumping (due to intermittent contact charging) of the nanofluid CPD cell and charge transfer because of nanofluid particle collisions driven by thermally-induced Brownian motion.

The nanofluid CPD battery has a low work function electrode and an inter-electrode gap-filling nanofluid. The nanofluid CPD battery utilizes the potential difference between dissimilar materials in close proximity or contact having different work functions, where non-equilibrium operation generates electrons and the ionizing properties of the intermediate work function nanoparticles in a fluid, both to create and carry current. A current generating cell includes a pair of electrodes of different work functions separated by a space filled with a nanofluid composed of coated nanoparticles (with an intermediate work function). Inducing differing Fermi levels in the anode and cathode by adding heat to the cathode or energy release from nanofluid particle agglomeration will drive a current to produce electrical power.

The nanofluid CPD battery can be grouped to multiply currents and voltages and can be coupled to a microelectronic chip for using the waste heat from the chip to drive electrical power generation in the nanofluid CPD battery.

Stacked nanofluid CPD cells (in series or in parallel) define the power flux to obtain a nanofluid CPD battery of desired current and voltage characteristics. In one particular implementation of the invention, the nanofluid CPD cell is formed directly on the substrate of a microelectronic circuit in order to provide an auxiliary power source for the microelectronic circuit.

The nanofluid CPD battery is made possible by a new method of fabrication of low work function electrodes.

The nanofluid CPD battery can generate useful amounts of electrical power converting thermal energy from a heat source only a slightly above ambient room temperature air (~100° C. above ambient). This battery should provide an ultra-long or virtually unlimited life battery with a stable, long-life current. This battery can be singular or a plurality of nanofluid CPD cells integrated into electronic devices to transfer heat and generate more power for microelectronic circuits without having an intrinsic corrosive effect.

BRIEF DESCRIPTION OF THE DRAWINGS

The present invention will be described by way of exemplary embodiments, but not limitations, illustrated in the accompanying drawings in which like references denote similar elements, and in which:

The accompanying drawings, which are incorporated into and constitute a part of this specification, illustrate one or more embodiments of the invention and, together with the detailed description, serve to explain the principles and implementations of the invention.

FIG. 7A is a simplified model of a nanofluid CPD cell for modeling its electrical behavior.

FIG. 7B is an equivalent circuit for the simplified nanofluid CPD cell model of FIG. 7a.

FIG. 7C demonstrates the difference in the energy of a junction before ($E_i$) and after ($E_f$) an electron tunnels across the junction from the electrode to a nanoparticle cluster.

DETAILED DESCRIPTION

Before beginning a detailed description of the subject invention, mention of the following is in order. When appropriate, like reference materials and characters are used to designate identical, corresponding, or similar components in different figures. The figures associated with this disclosure typically are not drawn with dimensional accuracy to scale, i.e., such drawings have been drafted with a focus on clarity of viewing and understanding rather than dimensional accuracy.

In the interest of clarity, not all of the routine features of the implementations described herein are shown and described. It will, of course, be appreciated that in the development of any such actual implementation, numerous implementation-specific decisions must be made in order to achieve the developer's specific goals, such as compliance with application and business related constraints, and that these specific goals will vary from one implementation to another and from one developer to another. Moreover, it will be appreciated that such a development effort might be complex and time-consuming, but would nevertheless be a routine undertaking of engineering for those of ordinary skill in the art having the benefit of this disclosure.

Use of directional terms such as "upper," "lower," "above," "below", "in front of," "behind," etc. are intended to describe the positions and/or orientations of various components of the invention relative to one another as shown in the various Figures and are not intended to impose limitations on any position and/or orientation of any embodiment of the invention relative to any reference point external to the reference.

Nanofluid Contact Potential Difference Cell—Structure Overview

Figure 1:
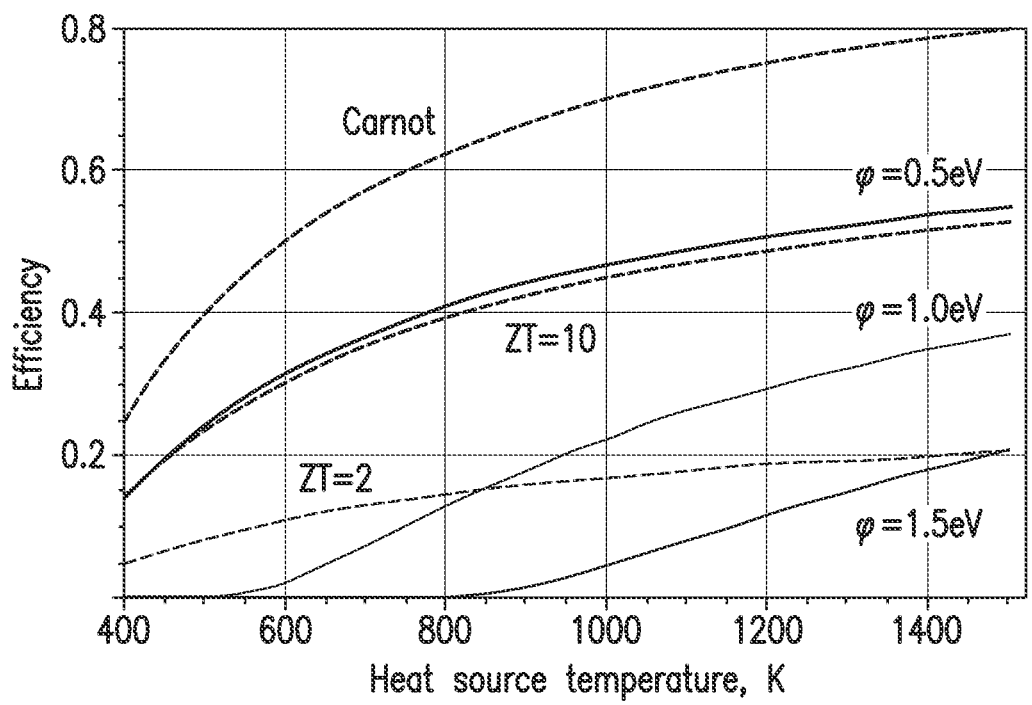
FIG. 1 is a graph showing thermionic work functions and thermionic figure of merit (ZT) compared to the Carnot efficiency.
Figure 2A:
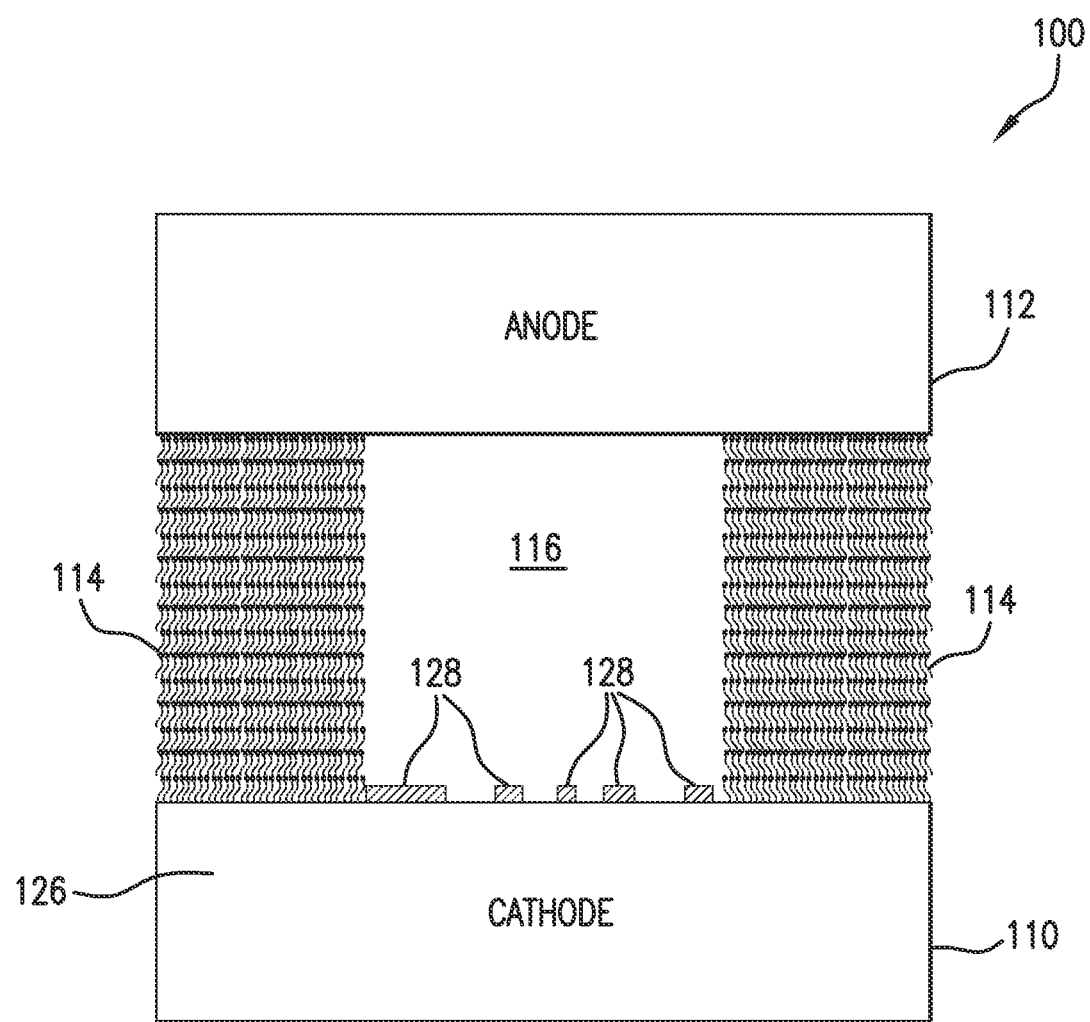
FIG. 2A is a cross-section view of a part of a nanofluid contact potential difference (CPD) cell with the nanofluid removed to reveal other details.
Figure 2B:
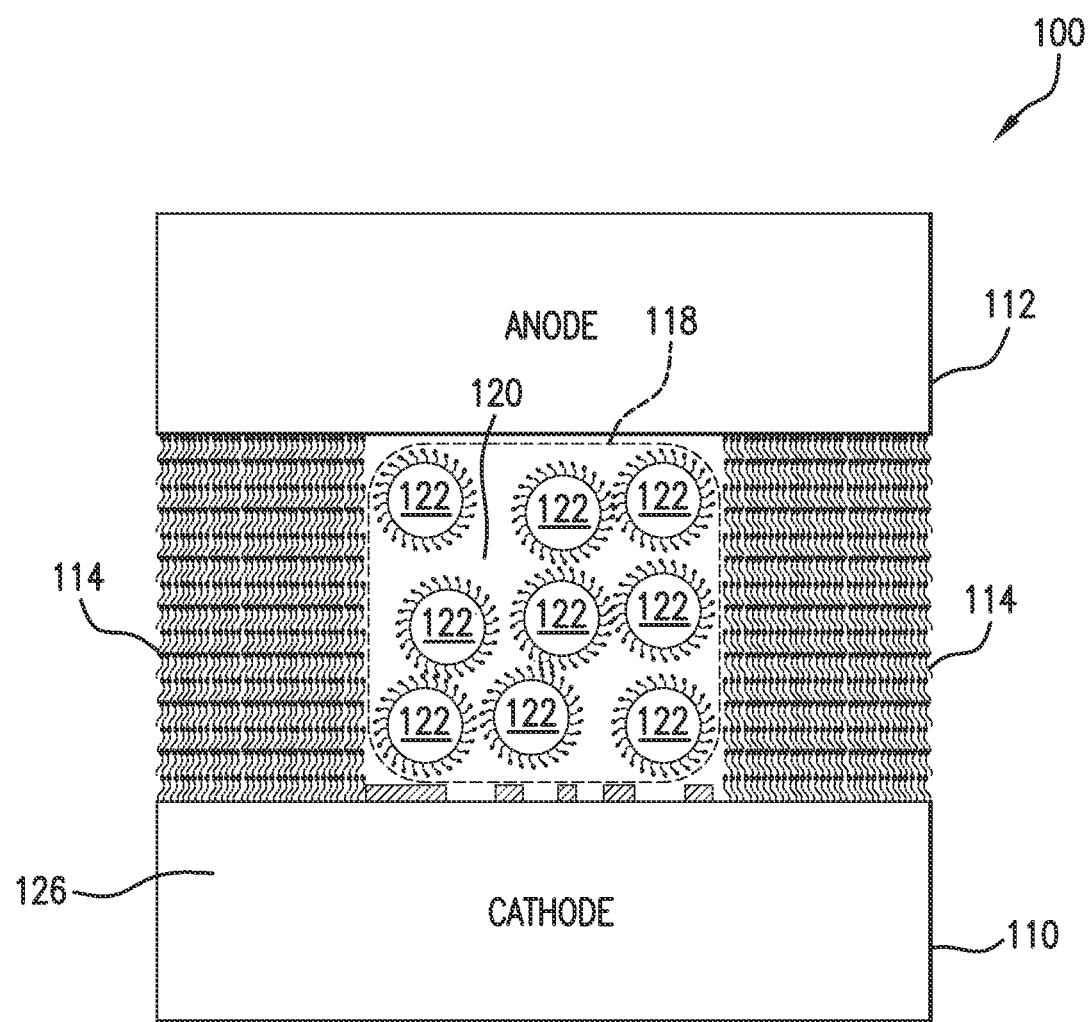
FIG. 2B is a cross-section view of a part of a nanofluid CPD cell with the nanofluid.
Figure 2C:
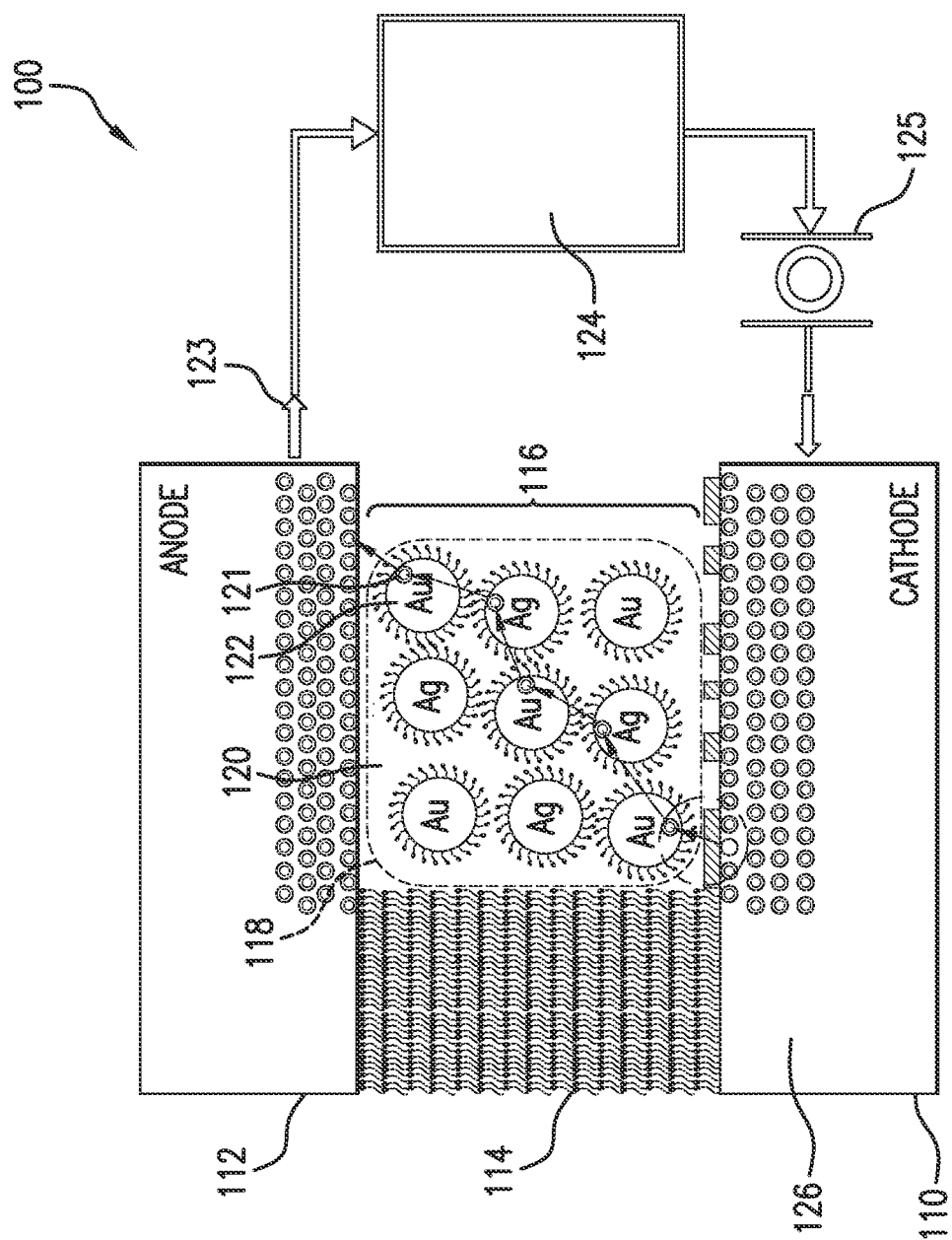
FIG. 2C is a cross-section view of a part of a nanofluid CPD cell with one of the insulating posts removed to reveal other details, connected to an electric load and electric switch.

FIGS. 2A, 2B and 2C show an exemplary embodiment of a nanofluid contact potential difference cell 100 configured for generating electrical energy. The basic structure of the nanofluid CPD cell 100 has a cathode 110 and an anode 112 separated by an insulator 114. The cathode 110 and anode 112 are collectively referred to as the electrodes of the nanofluid CPD cell 100. The insulator 114 does not fill the entire space between the cathode 110 and the anode 112, but rather forms walls around an interstitial space 116 and may also form posts within the interstitial space 116 or even internal walls that divide the interstitial space 116. The interstitial space 116 holds a nanofluid 118.

The cathode 110 and anode 112 are each of a different material and have different work functions, with the cathode 110 having a lower work function than the anode 112. As explained in more detail elsewhere herein, the difference in work functions drives charge transfer across the interstitial space 116, via the nanofluid 118. Both electrodes emit electrons, but due to its much lower work function, the cathode 110 tends to emit many electrons than the anode 112. This will tend to generate a net flow of electrons from cathode 110 to anode 112, or stated differently, a net current from anode 112 to cathode 110. This net current with cause the cathode 110 to become positively charged and the anode 112 to become negatively charged. In the exemplary embodiment, the anode 112 is comprised all or mostly of platinum, but in other embodiments may comprise other suitable high work function material.

The cathode 110 comprises a refractory substrate 126 with a thin film 128 on the surface facing the interstitial space 116. In the exemplary embodiment, the refractory substrate 126 comprises a base of tungsten, but in other embodiments may comprise some other suitable material, as discussed further elsewhere herein. In the exemplary embodiment, the thin film 128 is a cesium oxide coating that only partially covers the refractory material. The thin film 128 is made using an electro-spray technique, discussed further elsewhere herein. The electro-spray technique creates nanoparticles that form dipoles on the surface of the base material. The density of surface dipoles created by selected depositions is directly proportional (until saturation) to changes in the work function of the cathode 110 induced by the thin film 128 coating.

The nanofluid 118 comprises an electrolyte 120 and a plurality of nanoparticle clusters 122 with the nanoparticle clusters 122 suspended in the electrolyte 120. Some of the nanoparticle clusters 122 may comprise materials dissimilar from other of the nanoparticle clusters 122. In the exemplary embodiment, the nanofluid 118 comprises nanoparticle clusters 122 of gold (Au) and silver (Ag). The nanoparticle clusters 122 have intermediate work functions. That is, their work functions have values between the work functions of the cathode 110 and anode 112. As explained in more detail elsewhere herein, charge transport is facilitated by the intermediate work functions of the nanoparticle clusters 122 and the use of at least two types of nanoparticle clusters 122 with different work functions.

Nanofluid Contact Potential Difference Cell—Operation Overview

Thermally-induced Brownian motion causes the nanoparticle clusters 122 to move within the electrolyte 120 and they occasionally collide with each other and with the electrodes 110, 112. As they move and collide within the electrolyte 120, the nanoparticle clusters 122 transfer charge chemically and physically. The nanoparticle clusters 122 transfer charge chemically when electrons 121 hop from the electrodes 110, 112, to the nanoparticle clusters 122 and from one nanoparticle cluster 122 to another. The hops primarily occur during collisions and via quantum mechanical tunneling. Due differences in work function, electrons are more likely to move from cathode 110 to the anode 112 via the nanoparticle clusters 122 than in the reverse direction. This net electron current is the primary and dominant current of the nanofluid contact potential difference cell 100.

The nanoparticle clusters 122 transfer charge physically due to the ionization of the nanoparticles and an electric field generated by the differently charged electrodes 110, 112. The nanoparticle clusters 122 become ionized in collisions when they gain or lose an electron. Positive and negative charged nanoparticle clusters 122 in the nanofluid 118 migrate to the negatively charged anode 112 and positively charged cathode 110, respectively, providing a current flow. This ion current flow is in the opposite direction from the electron current flow, but much less in magnitude.

Ion recombination in the nanofluid 118 does occur, which diminishes both the electron and ion current flow. Electrode separation may be selected at an optimum width to maximize ion formation and minimize ion recombination. In the exemplary embodiment, the electrode separation is 10 nm. The nanoparticle clusters 122 used have maximum dimensions in the range of 3-7 nm, so the electrode separation is only 2 to 3 nanoparticle clusters 122 across. This is still enough distance for nanoparticle clusters 122 to move around and collide, but minimize ion recombination. An electrons can hop (tunnel) from the cathode 110 to a first nanoparticle cluster 122 and then to a second or third nanoparticle cluster 122 before hopping to the anode 112. Fewer hops means less chance for recombination.

When the cathode 110 and anode 112 are initially brought into close proximity, the electrons of the cathode 110 have a higher Fermi level than the electrons of the anode 112 due to the lower work function of the cathode 110. The difference in Fermi levels drives a net electron current that transfers electrons from the cathode 110 to the anode 112 until the Fermi levels are equal (thermodynamic equilibrium). The transfer of electrons results in a difference in charge between the cathode 110 and anode 112. This sets up a contact potential difference and an electric field between the cathode 110 and the anode 112. However, with Fermi levels equal, no net current will flow between the cathode 110 and anode 112. Once equilibrium is reached, if an external circuit 124 electrically connects the cathode 110 and anode 112, no net current will pass through the external circuit 124, because the Fermi levels of the cathode 110 and anode 112 are equal.

The nanofluid contact potential difference cell 100 can generate electric power with or without heat input. Heat added to the cathode 110 will raise its temperature and the Fermi level of its electrons. With the Fermi level of the cathode 110 again higher than the Fermi level of the anode 112, a net electron current will flow from the cathode 110 to the anode 112 through the nanofluid 118. If the external circuit 124 is connected, the same amount of electron current will flow as an external circuit current 123 from the anode 112 to the cathode 110. The heat energy added to the cathode 110 is carried by the electrons to the anode 112, where some of the added energy is transferred in collisions to the anode 112 and eventually lost to ambient. However, some of the added energy may be transferred to the external circuit 124 for conversion to useful work.

The nanofluid contact potential difference cell 100 can generate electric power without heat input with energy provided by the agglomeration of the nanoparticle clusters 122. The nanoparticle clusters 122 when agglomerated have a lower energy state than when not agglomerated. This energy released by nanoparticle cluster 122 agglomeration is transferred to electrons in the nanoparticle clusters 122. When the nanofluid contact potential difference cell 100 is in thermodynamic equilibrium, electrons are just as likely to move to either electrode 110, 112, due to the balance of forces between the electrical field and the different work functions of the cathode 110 and anode 112. With the added energy released by agglomeration, the electrons are more likely to overcome the electric field force and end up in the anode 112 than the cathode 110 so a net electron current will flow from the cathode 110 to the anode 112 through the nanofluid 118. If the external circuit 124 is connected, the same amount of electron current will flow as an external circuit current 123 from the anode 112 to the cathode 110. Some of the agglomeration energy transferred to the electrons is transferred in collisions to the anode 112 and eventually lost to ambient. However, some of the added energy is transferred to the external circuit 124 for performance of useful work. The amount of power generated by the agglomeration is much less than the power generated by adding heat to the cathode 110. Also, once the nanoparticle clusters 122 have undergone significant agglomeration, the nanofluid 118 is significantly degraded in its ability to transfer electrons, so the nanofluid contact potential difference cell 100 is significantly degraded in its ability to generate power.

When generating power, the nanofluid contact potential difference cell 100 experiences a significant decline in power output within a few microseconds. This is due to a large fraction of the nanoparticle clusters 122 becoming ionized in the process of transferring electrons and then being driven by the electrical field towards the electrodes 110, 112. With nanoparticle clusters 122 bunched up at the electrodes 110, 112, they are less likely to collide in-between and transfer electrons. A remedy to this is to briefly interrupt the external circuit 124 with a high speed electrical switch 125. Without the external circuit 124 to carry off electrons, they build up in the anode 112, strengthening the electric field and making electrons transfers from cathode 110 to anode 112 more difficult. The increasing electric field makes it less and less likely that electrons will tunnel from the cathode 110 to the nanoparticle clusters 122 and more and more likely that they will tunnel from nanoparticle clusters 122 back to the cathode 110. A greater fraction of nanoparticle clusters 122 become neutrally charged and by Brownian motion move back into the middle of the interstitial space 116 between the cathode 110 and anode 112. When the high speed electrical switch 125 closes again, the nanofluid contact potential difference cell 100 has been restored in its ability to generate power.

This energy-generating system is analogous to a classical system in which electrical charge is transferred or shuttled mechanically (e.g. by a contact switch) using two large capacitor plates (of different work functions) and a conductive ball (or particle) suspended between the plates. Charging one of the plates (and grounding the other) will attract the ball to the charged electrode via the Coulomb force and upon contact with the plate the ball will exchange electrons with the plate. The acquired excess charge on the ball will in turn accelerate the ball in the electric field between the plates to the grounded electrode, where the excess electrons are dumped upon contact. Depending on the system geometry (plate and ball size and distance between the plates), applied voltages, and the material in which the ball is suspended, the ball will cycle back and forth between the plates at a frequency which may reach a few kilohertz. The result is an effective transfer of charge (i.e. a current flow) between the plates. This simple description extended to the nanoscale-sized ball impacting a low work function electrode is the basis of the nanofluid CPD cell 100. However, one should remember this ball analogy is simplified and lacks many of inventive features of the nanofluid CPD cell 100.

Cathode Fabrication

The modification of the work function of an electrode can be accomplished using electrospray techniques. The work function is an interfacial parameter of the surface of a material that indicates how easily electrons can escape the surface. Materials with lower work functions generally facilitate electron emission. By employing new electrospray and nanofabrication techniques, new nanostructured multi-layer materials with ultra-low work functions can be produced. In the exemplary embodiment, a patterned electrospray deposition of cesium oxide on a tungsten monolayer can produce a covalently-bonded electrode with a work function around 0.88 eV (with a Richardson constant of $8 \times 10^4$ A/m$^{2\circ}$ K$^2$). Usually, a tradeoff exists between the lowering of a work function and the reduction of the Richardson constant, but that tradeoff is bypassed with this electrospray deposition process. As is shown elsewhere herein, these values are sufficient to enable room temperature thermal energy harvesting.

Figure 11:
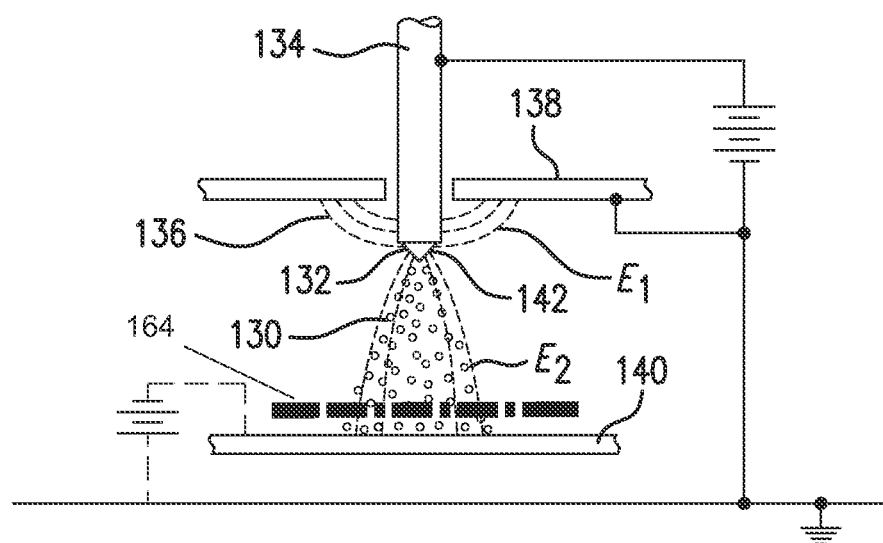
FIG. 11 shows a process for generating an electrospray of dipole nanoparticle clusters that deposit on a surface of a refractory material.

As described in more detail elsewhere [Fernandez de la Mora et al. 1990], an electrospray 130 is generated when a conductive liquid 132 in an emitter tube 134 is exposed to an electrical field 136 between the emitter tube 134 and an extractor electrode 138 (See FIG. 11). A Taylor cone 142 forms and a fine jet issues from the apex of the Taylor cone, which eventually breaks up into the electrospray 130 of monodispersed droplets that travel through a template 164 towards a collector electrode 140, which is the refractory base 126 of the cathode 110. The collector electrode 140 is grounded to enable the direct deposition of droplets to form a pattern thereon. Monodispersed droplets are characterized by nanoparticles of uniform size in a dispersed phase. The electrospray process produces monodisperse particles with relative ease, which is a unique capability in the nanometer scale range. Monodispersed micron-sized and nanodroplets have been produced from both high viscosity and lower viscosity materials.

The droplets follow a path to the collector electrode 140 influenced by multiple forces. A model that tracks each droplet in a dilute two-phase flow results in a force balance equation with the force of gravity balanced by the buoyant, fluid flow drag and the electric field forces is shown in Equation 1.

$$\rho_d g \left( \frac{\pi D^3}{6} \right) = \rho g \left( \frac{\pi D^3}{6} \right) + C_D \left( \frac{\pi D^2}{4} \right) \left( \frac{\rho V^2}{2} \right) + qE \qquad \text{Equation 1}$$

in which $\rho_d$ is the particle density, p is the gas density, D is the droplet diameter, V is the droplet velocity, g is gravity (9.8 m/s$^2$), $C_D$ is the drag coefficient, q is the charge on a droplet and E is the driving electric field. Magnetic field forces are assumed negligible and thus ignored. Equation 1 indicates that the charge (q) deposited on the droplets is important for the surface bonding mechanisms.

Production of the exemplary embodiment cathode 110 uses an electrospray of a 10% cesium oxide in ethanol solution, with a particle density $\rho_d$ of 4650 Kg/m$^3$ and a droplet diameter D of 10 microns ($10 \times 10^{-6}$ m), a droplet charge q of 14 C/(kg of droplets) and a driving electric field E of 5 kV/cm.

The right-hand side terms of Equation 1 account for the buoyant force of the gas, drag force by the surrounding gas, and the force on the droplets by the external electric field, respectively. Image charges induced by the charged droplets on the extractor electrode 138 and collector electrode 140 surfaces initiate covalent bonding. Both the extractor electrode 138 and collector electrode 140 are assumed to be large planes. The surface charge density is assumed constant for all droplets (De Juan & Fernandez de la Mora, 1997). This assumption is reasonable for droplets used in this work, since the charge relaxation time is one order of magnitude larger than the jet breakup time. Therefore the charge remains approximately "frozen" during the jet breakup and result in covalently-bonded dipoles on the electrode surfaces.

The target concentration for the cathode 110 is $10^{14}$ cesium oxide atoms per $cm^2$. The electrospray deposition creates covalently-bonded dipoles on the surface to produce a work function of 0.88 eV and a Richardson constant of $8 \times 10^4$ $A/m^{2\circ} K^2$.

Insulator Fabrication

The insulator 114 may be constructed using self-assembling monolayers (SAM). This will allow creation of the interstitial space 116 with a gap of only a few nanometers (10 nm in the exemplary embodiment) between the cathode 110 and anode 112. A gap of this size will reduce space-charge effects. The cathode 110 and anode 112 are coated with functional surfactant alkane-thiol molecules. Alkane-thiol molecules have been previously used to wrap a full monolayer around a nanoparticle cluster [Sigma-Aldrich, MFCD09953506] to prevent coalescence [Templeton, 2000]. This molecular monolayer has a protecting function and determines the nature of the alkane-thiol interactions [Daniel, 2004]. Long chain thiols are the most widely used surfactant molecules, particularly for gold nanoparticles. Their self-assembly on metal surfaces is based on the formation of a covalent metal-sulfur bond (ca. 50 kcal $mol^{-1}$) and of attractive van der Waals interactions between the hydrocarbon chains, the strength of which scales with the length of the chain (ca. 1.5 kcal $mol^{-1}$ per methylene group) [Whitesides, 2005]. On flat metallic surfaces, these interactions lead to the formation of highly ordered self-assembled monolayers (SAMs), [Schreiber, 2000]. The self-assembled monolayers formed on the surfaces of the cathode 110 and anode 112 are then laser-ablated to form a pattern of posts and gaps. The thin film 128 (Cesium oxide in the exemplary embodiment) is then placed on the surface of the cathode 110 in the gaps between the posts. The indexed electrodes are then aligned creating posts and gaps between the cathode 110 and anode 112. The nanofluids that fill the gaps are described elsewhere herein. In the exemplary embodiment, the insulator 114 is made of alkane-thiol 10 nm thick separating the cathode 110 and anode 112 (using 5 SAM layers on each electrode).

Modification of Work Functions Due to Different Materials

For optimization, the cathode 110 and the anode 112 should have as large a work function difference as possible, preferably at least 3 volts. The work functions of the bulk materials of selected elements are listed in Table 1.

TABLE 1

Bulk Material Elemental Work Functions Element

| Element | Φ (eV) | Element | Φ (eV) | Element | Φ (eV) |
| --- | --- | --- | --- | --- | --- |
| Cs | 2.14 | As | 3.75 | Fe | 4.5 |
| Rb | 2.26 | Tl | 3.84 | Sb | 4.55 |
| K | 2.30 | Hf | 3.9 | W | 4.55 |
| Eu | 2.50 | Zr | 4.05 | Mo | 4.6 |
| Sr | 2.59 | Mn | 4.1 | Cu | 4.65 |
| Ba | 2.7 | In | 4.12 | Ru | 4.71 |
| Sm | 2.7 | Ga | 4.2 | Os | 4.83-5.93 |
| Na | 2.75 | Bi | 4.22 | Si | 4.85 |
| Ca | 2.87 | Cd | 4.22 | Te | 4.95 |
| Ce | 2.9 | Pb | 4.25 | Re | 4.96 |
| Li | 2.93 | Ta | 4.25 | Be | 4.98 |
| Tb | 3.0 | Ag | 4.26 | Rh | 4.98 |
| Gd | 3.1 | Al | 4.28 | C | 5.0 |
| Y | 3.1 | Nb | 4.3 | Co | 5.0 |
| Nd | 3.2 | V | 4.3 | Ge | 5.0 |
| Lu | 3.3 | Ti | 4.33 | Au | 5.1 |
| Th | 3.4 | Zn | 4.33 | Pd | 5.12 |
| La | 3.5 | Sn | 4.42 | Ni | 5.15 |
| Sc | 3.5 | B | 4.45 | Jr | 5.27 |
| U | 3.63 | Hg | 4.49 | Pt | 5.65 |
| Mg | 3.66 | Cr | 4.5 | Se | 5.9 |

Additionally, the combination of elements can create the desired work functions as shown in Table 2. Modifying of the combination of elements can change the work function of the combination.

TABLE 2

Modifications of Work Functions Element

| Elements | Φ (eV) | Elements | Φ (eV) |
| --- | --- | --- | --- |
| Absorbed Film Emitters | | | |
| W-Cs | 1.5 | Mo-Th | 2.6 |
| W-Ba | 1.6 | Ta-Th | 2.5 |
| W-Ce | 2.7 | | |
| Thin Oxide Films | | | |
| BaO on W | 1.2 | SrO on W | 1.3 |
| Rare Earth Oxides | | | |
| $La_2O_3$ | 3.18 | $Nd_2O_3$ | 2.96 |
| $Sm_2O_3$ | 2.98 | $Gd_2O_3$ | 3.0 |

The modification of the nanoparticle clusters 122 can be the result of the deposition of alloying films composed of different nanoparticles, thin oxide films, and rare earth oxides.

The cathode 110 comprises a thermionic emissive material that is preferably an alkaline earth oxide in combination with a refractory metal. Thermionic emissive materials can be selected from barium oxide, calcium oxide, and strontium oxide-combinations of these oxides, along with additions of aluminum and scandium oxides, as adjunct oxides. The preferable refractory metal to incorporate into the electron emissive oxide is tungsten, but could also include rhenium, osmium, ruthenium, tantalum, and iridium, or any combination of these metals can be used as base metals for the electrode deposition. Alternatively, alkali or alkaline earth metals, such as cesium and barium, can be used with a high work function metal like tungsten. Tantalum, rhenium, osmium, ruthenium, molybdenum, iridium, and platinum, or any combination of these metals can also be used with alkali or alkaline earth metals, such as cesium and barium.

Figure 3:
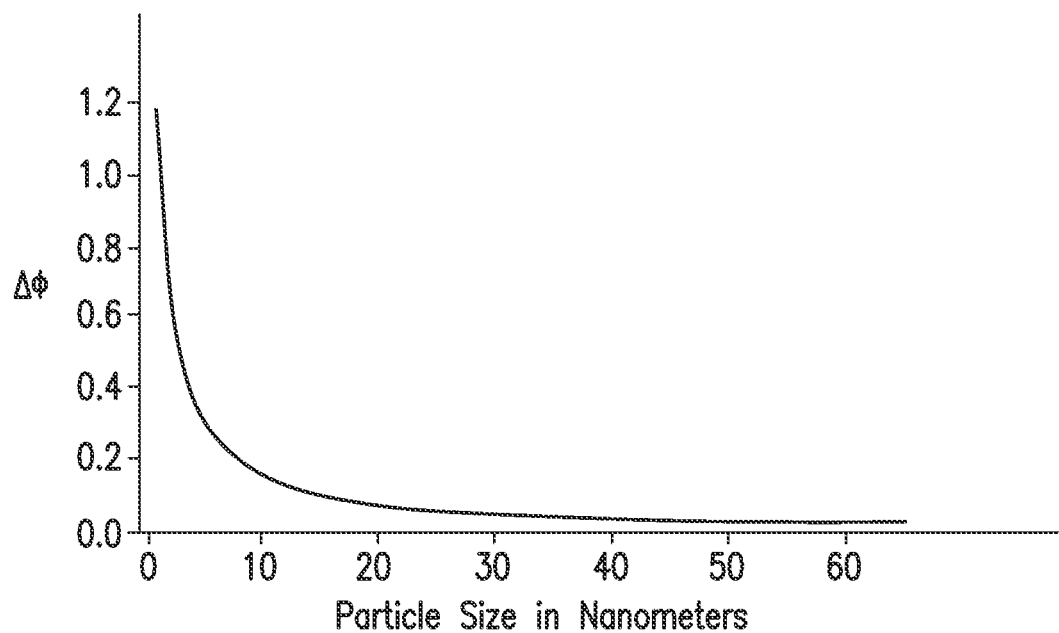
FIG. 3 is a graph of work function changes as a function of nanoparticle cluster (NPC) diameter.

Modification of the Work Function of the Mobile Nanoparticle Clusters Due to Size For objects in the size range of nanoparticles, the work function of the object is dependent on the size selected as well as the material selected. The size of a nanoparticle cluster is inversely related to its work function ($\varphi$) as shown in FIG. 3. The work function changes more than 1 eV with the size of a nanoparticle approaches that of a single atom. Conversely, as the nanoparticle enlarges, the work function approaches the measurements associated with bulk materials. This property of a work function of a material increasing with decreasing particle size enables the tailoring of the nanoparticle clusters 122 for each nanofluid CPD cell 100 application. The larger the work function difference between the nanoparticle clusters 122 and the cathode 110, the more electrons are transferred.

The nanoparticle Fermi energy varies with size, leading to increasing work function $\phi$ as dimensions shrink (see Equation 2 and FIG. 3):

$$\varphi(r) = \varphi(\infty) + \frac{B}{r} \quad \text{Equation 2}$$

where B is a constant [Snider 1983], (e.g., a shift from 4.50 to 4.53 eV for a 10-nm radius tungsten (W) nanoparticle [Sodha 1970]). At very small sizes, the work function changes fluctuate due to the changes in finite small numbers of surface atoms [Kolesnikov 1977].

The optimal size for the nanoparticle clusters 122 is in a range of 3-8 nanometers (nm).

Quantum Mechanical Physical Basis of the Nanofluid CPD Cell

Figure 5:
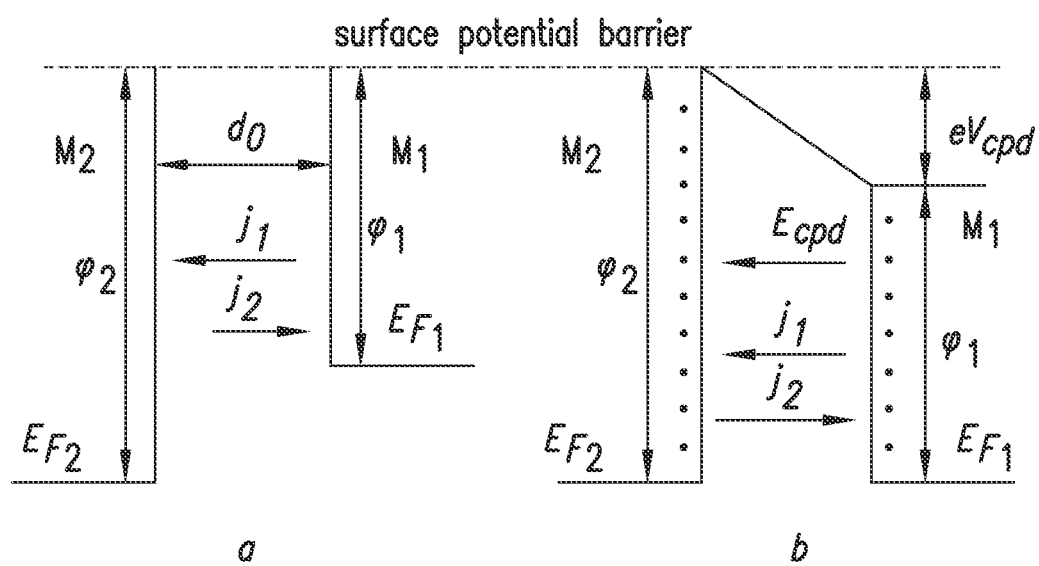
FIG. 5 is electron energy level diagram illustrating contact phenomena in the case of two metals separated by a narrow gap where charge transfer can occur; (a) before equilibrium, (b) after equilibrium.

This section discusses the quantum mechanical basis for the nanofluid CPD cell 100 operation using parameter values from the exemplary embodiment. FIG. 5 is a schematic of contact phenomena in the case of two metals separated by a narrow gap where charge transfer can occur; (a) before equilibrium, (b) after equilibrium (Zharin, et. al. 1998). $M_1$ corresponds to the cathode 110, which in the exemplary embodiment is tungsten-cesium oxide (W—Cs$_2$O) and $M_2$ corresponds to the anode 112, which in the exemplary embodiment is platinum (Pt). The two metals are separated by a narrow vacuum gap where electrons can flow. The work function is represented as the difference between the Fermi level of a metal, $E_F$, and the surface potential barrier (the dashed line in FIG. 5). FIG. 5a corresponds to the initial case when the metals are brought to within a distance of $d_0$ and an effective electron exchange caused by electron emission (or tunneling) is possible.

In accordance with the Richardson-Dushman law, the currents from the first and second metals are found in Equations 14 and 15:

$$j_1 = A_r T^2 \exp\left(\frac{-\varphi_1}{kT}\right) \quad \text{Equation 14}$$

$$j_2 = A_r T^2 \exp\left(\frac{-\varphi_2}{kT}\right) \quad \text{Equation 15}$$

where $\varphi_1$ and $\varphi_2$ are the electron work functions of metals 1 (Tungsten-cesium oxide—0.88 eV) and 2 (Platinum—5.65 eV), respectively, T is the absolute temperature (373° K), k is the Boltzmann constant (8.62×10$^{-5}$ eV/° K), and $A_r$ is the Richardson constant (that varies for each material with a maximum of 1.2×10$^6$ A/m$^2$K$^2$ with W—Cs$_2$O 8×10$^4$ and 320×10$^3$ A/m$^2$K$^2$ with Pt). Since the work function of metal 2, $\varphi_2$, is greater than the work function of metal 1, $\varphi_1$, (as in FIG. 5a), then the current, $j_1$, is greater than current $j_2$, (0.014 A/m$^2$ and 2.14×10$^{-66}$ A/m$^2$, respectively). Assuming the area presented by both $M_1$ and $M_2$ is 10$^{-2}$ m$^2$, the current transferred from metal 1 to metal 2 is approximately 0.014 A. Therefore, electrons will be transferred to the material with the larger work function. As shown in FIG. 5b, the first metal surface ($M_1$ with the lower work function $\varphi_1$) is charged positively and the second metal ($M_2$ with the higher work function) negatively. An electric field, $E_{CPD}$, and a contact potential difference, $V_{CPD}$, appear in the gap, correspondingly. In this case, the condition of equilibrium is the equality of the Fermi levels wherein the currents are matched, i.e. $j_1 = j_2$. This equality signifies that the potential barrier for the electrons moving from the right to the left, i.e. $\varphi_1 + eV_{CPD}$, is equal to the potential barrier for the electrons moving from the left to the right, i.e. $\varphi_2$. In other words, the following equality is valid to derive the contact potential difference, $V_{CPD}$, in Equation 16:

$$\varphi_1 + eV_{CPD} = \varphi_2 \text{ where } V_{CPD} = \frac{\varphi_2 - \varphi_1}{e} \quad \text{Equation 16}$$

where e is the magnitude of charge of an electron. Assuming that both conductors are at the same temperature, electrons will migrate across the contact surface from the material having the lower work function to the material having the greater work function. Thus, the average energy level of the electrons in the material with the greater work function, $E_{F2}$, will be lowered and correspondingly the average energy level of the electrons in the material with the lower work function, $E_{F1}$, will be raised. This migration of electrons across the contact surface will continue until the average energy levels of the two materials are equalized and in equilibrium. The polarity of $V_{CPD}$ is determined by the material having the greatest work function.

Figure 6:
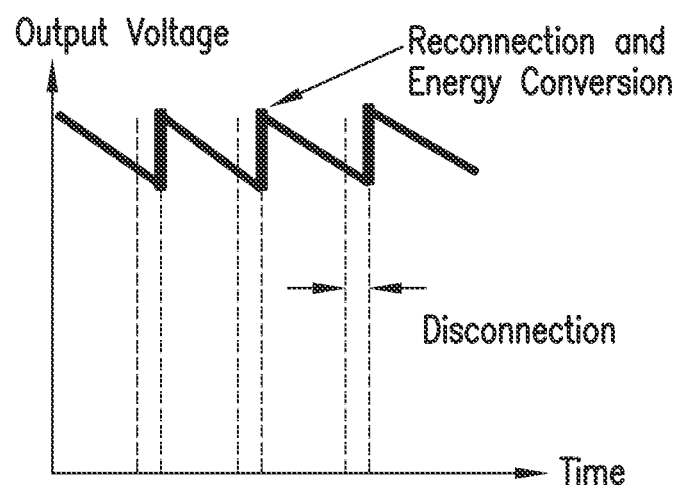
FIG. 6 is a graph of output voltage of a nanofluid CPD cell in operation over time, illustrating an electron pumping phenomena due to intermittent contact of the nanofluid CPD cell electrodes.

Non-Equilibrium Charging: Rapid Switching to Transfer Electrons to the Nanofluid A transient electric current will flow when two different work function electrode materials are in electrical contact and the current flow will cease when an equilibrium is reached (i.e. when the thermoelectric currents are matched, $j_1 = j_2$). In the nanofluid CPD cell 100, as the currents equalize, the contact between the cathode 110 and anode 112 is broken by the electrical switch 125, grounded, and rapidly reconnected to reinitiate the differences between $j_1$ and $j_2$. Equilibrium between cathode 110 and anode 112 can occur in picoseconds (ps) [Feldheim, 1998]. This inequality or non-equilibrium operation due to intermittent contact (see FIG. 6) pumps additional electrons (when, $j_1$, is greater than current $j_2$), to the anode 112. An additional current can be made to flow in the circuit by providing an external source of charge (e.g. electron transfers from the collisions of different work function nanoparticles with the electrodes and with each other in the nanofluid).

If the current exchange has equilibrated ($j_1 = j_2$), then the two electrodes are disconnected, grounded, and then reconnected enabling the energy conversion capacity of the nanofluid CPD cell 100 to be rapidly recovered. After reconnection by the electrical switch 125, the non-equilibrium currents described earlier will be reestablished and these electron pulses will charge the nanoparticle clusters 122 residing in the in the interstitial space 116 between the electrodes.

The electrical switch 125 needs to break contact rapidly. This electrical switch 125 is the only energy consuming part of the nanofluid CPD cell system. A parallel array of nanofluid CPD cells 100 would need only a single electrical switch 125 to operate efficiently. Several alternative switch designs could be used including a rotating contact switch, a plasma discharge created in a gap that conducts electricity across a gap, or even a simple photocathode oscillating with the driving frequency.

The electrical switch 125 can be powered by the nanofluid contact potential difference cell 100. For example, if the electrical switch 125 is a plasma discharge switch, the placement of approximately 3 volts from a nanofluid CPD cell 100 could generate a discharge in the small inter-electrode distances ($3V/10 \times 10^{-9}$ m=3000 kV/cm). The voltages exceed the 30 kV/cm which sustains a plasma discharge at atmospheric pressure.

Use of Nanoparticle Clusters (NPCs) for the Generation, Transfer, and Storage of Charge in a Nanofluid The nanofluid 118 is comprised of the electrolyte 120 with nanoparticle clusters 122, which may include metals, ceramics, cermet, composites, and other materials. This nanofluid 118 resides in the nanofluid CPD cell 100 to generate, store, and transfer charge and to move heat if a temperature difference exists. Thermal energy can cause the production of electrons to increase from the cathode 110 into the nanofluid CPD cell 100 mainly as temperature squared as shown in Equation 14 and 15. Therefore, increased temperature generates more current.

The nanoparticle clusters 122 have conductive cores with an insulating, anti-coagulant coating. In the exemplary embodiment, the nanofluid 118 is a mixture of nanoparticle clusters 122 with gold cores and nanoparticle clusters 122 with silver cores, all with coatings of alkane-thiol. Specifically, the gold nanoparticle clusters are dodecanethiol functionalized gold nanoparticles (Au—$SCH_2(CH_2)_{10}CH_3$), particle size 3-5 nm, 2% (w/v) in toluene, purchased from Sigma-Aldrich (product no. 54349). The silver nanoparticle clusters are dodecanethiol functionalized silver nanoparticles (Ag—$SCH_2(CH_2)_{10}CH_3$), particle size 3-7 nm, 0.25% (w/v) in hexane, purchased from Sigma-Aldrich (product no. 667838). The coatings of the nanoparticle clusters 122 are primarily to prevent coagulation of the nanoparticle clusters 122. In the exemplary embodiment, Dodecanethiols were used, but other alkanes shorter than Dodecanethiol and Decanethiol will work as well. The length of the alkane chain is limited by the need for the nanoparticle conductive cores to be within 1 nm to transfer electrons from one conductive surface to another. The cores of the nanoparticle clusters 122 are selected for their abilities to store and transfer electrons. In the exemplary embodiment, the cores of the nanoparticle clusters 122 are noble metals, but any conductive particle can be used. In the exemplary embodiment, a 50%-50% mixture of gold and silver nanoparticle clusters 122 was used. However, a mixture in the range of 1-99% gold to silver could be used as well. Electron transfers are more likely between nanoparticle clusters 122 with different work functions, so a mixture of nearly equal numbers of two dissimilar nanoparticle clusters 122. The electrolyte 120 in the exemplary embodiment is water.

Conductivity of the nanofluid 118 can be increased by increasing the concentration of nanoparticle clusters 122. The nanoparticle clusters 122 may have a concentration within the nanofluid 118 of 0.1 mole/liter to 2000 mole/liter. In the exemplary embodiment, the gold and silver nanoparticle clusters 122 each have a concentration of 1000 mole/liter [1000 M].

Nanoparticle clusters are so thin they are often considered to have only one dimension: their characteristic length. This extreme thinness restricts electrons and holes in a process called quantum confinement, which increases electrical conductivity. A nanocluster's small size also increases the influence of its surfaces, increasing thermal conductivity. The collision of particles with different quantum confinement transfers charge to the electrodes.

As the nanofluid CPD cell 100 pumps electrons onto the nanoparticle clusters 122, energy is stored in the system. In fact, the charge on an atom analogy does have a mathematical foundation. The potential energy of a two-particle system (the hydrogen atom) is $\frac{1}{4\pi\varepsilon_0}(e^2/r)$ and the capacitance of an isolated sphere is $4\pi\varepsilon_0 r$ (where r is the sphere radius). Combining these terms yields the energy of a hydrogen atom in terms of its capacitance. This is similar to the energy stored in a capacitor or $E_i=(q)^2/2C_T$. Extending this argument, the energy of a hydrogen-like nanoparticle "atom" is obtained. The capacitance ($C_{CLU}$) of a spherical nanoparticle coated with a uniform monolayer (of dielectric constant . di-elect cons) and in an electrolyte solution can be expressed as shown in Equation 17:

$$C_{CLU} = A_{CLU} \frac{\varepsilon\varepsilon_0}{r} \frac{r+d}{d} = 4\pi\varepsilon\varepsilon_0 \frac{r}{r}(r+d) \qquad \text{Equation 17}$$

where $\varepsilon_0$ is the permittivity of free space, $A_{CLU}$ the surface area of the nanoparticle core of radius r, and d the thickness of the protecting dielectric monolayer. Equation 17 predicts that when core size and protecting monolayer thickness are comparable (where r=0.5-1.5 nm and d=0.5-1.0 nm), $C_{CLU}$ increases with increasing core radius, and for monolayers with similar dielectric property, decreases with increasing monolayer thickness. Considering the limits of Equation 4, when r<<d, $C_{CLU}=\varepsilon\varepsilon_0 A_{CLU}/r$, (e.g., a naked nanoparticle in a thick dielectric medium) and when r>>d, $C_{CLU}=\varepsilon\varepsilon_0 A_{CLU}/d$, (akin to a nanoparticle cluster monolayer on a flat surface) establishes the boundaries of the problem. The capacitance, $C_{CLU}$, of a nanoparticle is about $10^{-18}$ F.

The stability and reactivity of colloidal particles is determined largely by the ligand shell adsorbed or covalently bound to the surface of the nanoparticle. Nanoparticles tend to aggregate and precipitate; this can be prevented by the presence of a ligand shell enabling these nanoparticles to remain suspended. Adsorbed or covalently attached ligands can act as stabilizers against agglomeration and can be used to impart chemical functionality to nanoparticles. Over time, the surfactant nature of the ligand coatings is overcome and the lower energy state of agglomerated nanoparticles is formed.

As shown in FIGS. 7A-C, a standard approach models the nanofluid CPD cell 100 as two capacitors with capacitances and resistances $C_1$, $R_1$ and $C_2$, $R_2$ placed in series and driven by an ideal voltage source, $V_{ext}$, [Feldheim, 1998]. The term "ideal voltage source" is used to describe a battery with zero internal resistance which can deliver charge instantly. FIG.

7A shows a model of the nanofluid CPD cell 100. Junction 1 is the junction between the cathode 110, insulator 114, and nanofluid 118. Junction 2 is the junction between the nanofluid 118, insulator 114, and the anode 112. FIG. 7B shows an equivalent circuit for this model. The state of the system is described by conventional variables such as the voltage drop across each junction ($V_1$, $V_2$) and $Q_0$, the charge stored in the nanofluid 118 based on the number of electrons on the nanoparticle clusters 122. The dynamics of the system are then determined by the probabilities that an electron will tunnel across junction 1 and/or junction 2, thus altering $Q_0$ (i.e., a stochastic approach). These tunneling events are dependent on the change in energy of each electron as it tunnels from the bulk metal through junction 1 and onto one of the nanoparticle clusters 122.

To quantify this dependence, consider what happens to one of the nanoparticle clusters 122 within the nanofluid CPD cell 100 upon contacting the two metal electrodes (cathode 110 and anode 112) but before an external bias is applied. The Fermi levels of the two bulk metal electrodes and the nanoparticle cluster will try to align by tunneling electrons from the electrodes to the cluster. In general, the Fermi levels will not be able to align exactly but will be offset in energy by one electron or more because of the discrete nature of charge and any impurities present in the junction region. Ignoring these details for now, the case of perfect alignment is considered. One further initial assumption is that the quantum mechanical energy levels are closer in energy than the electrostatic energy levels. Now that the system is in electrostatic equilibrium, a potential is applied by the voltage source and (n) electrons tunnel through the thin insulating barrier and onto the cluster. Our goal is to find (n) as a function of the applied potential (or applied energy). To describe this process energetically, we focus on junction 1 alone (the local view) seeking the quantity $\Delta E_1 = E_f - E_i$ where $\Delta E_i$ is the difference in the energy of junction 1 before ($E_i$) and after ($E_f$) the electron tunnels (see FIG. 7C). This quantity represents the energy that must be supplied by the external voltage source to place an electron on the nanoparticle cluster. The initial state is the energy of junction 1 charged by (n) electrons. This energy stored in a capacitor is given by Equation 18, where $C_T = C_1 + C_2$ is the total nanoparticle cluster capacitance.

$$E_i = (ne)^2/2C_T \qquad \text{Equation 18}$$

(Note that $C_T$ is not the circuit capacitance [$1/C_T = 1/C_1 + 1/C_2 = (C_1+C_2)/(C_1 C_2)$] but is the capacitance an electron 'sees' when tunneling across the first junction). The entire circuit capacitance results in identical energy Equations (Feldham, 1998). The final state energy, $E_f$ is the energy of the system with an electron on the nanoparticle cluster. Placing an electron on the cluster lowers the potential across $V_1$ which causes a polarization charge to flow through the circuit. Consequently, the battery does work $eV_1$ to bring an electron from metal electrode 2 to electrode 1. Combined with the energy associated with changing the nanoparticle cluster charge by one electron one obtains Equation 19.

$$E_f = eV_1 + [(Q_0-e)^2/2C_T] \qquad \text{Equation 19}$$

Upon expanding term 2 in Equation 6 and subtracting Equation 5 (where n is 1), we obtain Equation 20.

$$E_f - E_i = eV_1 - (Q_0 e/CT) + (e^2/2C_T) \qquad \text{Equation 20}$$

Note that the energy of the system is fully described by the change in the nanoparticle cluster charge and the work done by the voltage source. To calculate the external voltage that must be applied by the nanofluid CPD cell 100 or thermal voltage (25.85 mV at 300K), a relation between $V_1$ and $V_{ext}$ is needed. This is obtained using Kirchhoffs loop laws and charge conservation. First, note from charge conservation that Equation 21 holds.

$$C_1 V_1 = C_2 V_2 \qquad \text{Equation 21}$$

From Kirchhoffs laws we obtain Equation 22.

$$V_{ext} = V_1 + V_2 \qquad \text{Equation 22}$$

Combining Equations 20 and 21 yields Equation 23, $$V_1 = C_2 V_{ext}/C_T \qquad \text{Equation 23}$$

and finally Equation 24.

$$\Delta Et = (eC_2 V_{ext}/C_T) - (eQ_0/C_T) + (e^2/2C_T) \qquad \text{Equation 24}$$

Close examination of Equation 24 reveals that the first term is the work performed by the voltage source to maintain $V_1$ after an electron has tunneled to the nanoparticle cluster. Terms 2 and 3 represent the single electron charging effects. Term 2 is the additional work required to tunnel an electron to the cluster if electron(s) are already present on the cluster. This term provides the voltage feedback necessary to prevent the tunneling of more than n electrons to the nanoparticle cluster per voltage increment. This prevents more than the allowed number of electrons (n) from residing on the nanoparticle cluster simultaneously. The current can now be rationalized by considering the allowed voltage change of the junction, ($\Delta V > 0$ due to contact potential and thermal voltages). If this were not the case the electron would immediately tunnel back to where it originated.

In the case of an initially neutral nanoparticle ($Q_0 = 0$), an external voltage of $e/2C_2$ is required before current may flow through the circuit (the Coulomb gap). When this voltage is reached, then a single electron tunnels onto the nanoparticle cluster. The electron does not remain on the cluster indefinitely but quickly tunnels off through the next junction [approximately 100 picoseconds ($10^{-12}$ seconds)] depending on the ratio $R_2 C_2 / R_1 C_1$). It does remain long enough, however, to provide the voltage feedback required to prevent additional electrons from tunneling simultaneously to the nanoparticle cluster. Thus, from V=IR, a continuous 1 electron current can be found in Equation 25:

$$I = e/2R_2 C_T \qquad \text{Equation 25}$$

This current, I, flows through the circuit (e/RC contains units of charge per time). Each additional electron placed on the cluster requires a full $e/C_2$ in voltage.

A number of important assumptions regarding Equations 14-25 must be emphasized. (i) The only electron transfer events considered were from the electrodes to the nanoparticle cluster. Other tunneling pathways, such as those from cathode 110 to anode 112 between the nanoparticle clusters 122, were not considered. (ii) The voltage source was assumed to deliver charge as fast as the electron tunnels but the time between tunneling events was long. (iii) Misalignments in the Fermi level due to charge offsets or impurities were not considered. These can be accounted for simply by adding a voltage offset term to Equation 19. (iv) The quantum mechanical energy level spacing was assumed to be smaller than the electrostatic energy spacing. This assumption is valid for metal particles less than approximately 5 nm in diameter. (v) Tunneling from one metal electrode onto the nanoparticle cluster was considered exclusively. The opposite case, tunneling from the cluster to the metal electrode, occurs by reversing the applied bias. Finally, (vi) the resistances of the junctions are so large ($R > h/e^2$) that the electrons are localized on one side of the junction or the other. If R and C for the two junctions are equal, then the electron will tunnel through both junctions with identical rates. Unfortunately, since C decreases but R increases as the junction thickness increases, these ratios can only be optimized by constructing the two junctions from materials with different dielectric properties.

Increasing the Amount of Self-Charge Transfer as a Function of the Number of Nanoparticle Clusters in the Nanofluid Finally, it should be noted that the Equations for a single nanoparticle cluster can be expanded for any number of nanoparticle clusters in a contact potential cell. The arguments above hold for systems of nanoparticle clusters with the exception that the current steps are of magnitude Ne/RC (where N is the number of nanoparticle clusters). In other words, each cluster acts as a single device with their currents additive. An additional linearization in these multiple nanoparticle cluster systems is that the dispersity in the diameter of the nanoparticle clusters can be large. These varying capacitances (and charging energies) of the nanoparticle clusters will cause the ohmic response. Also, the design of a nanofluid CPD cell device is augmented by thermal effects. The thermally-activated tunneling processes, where $e/2C_2 \gg kT$, occur as the temperature, T, increases the single electron transitions to produce an ohmic response (linear current-voltage [I-V] curve).

The nanofluid 118 is used to transfer charge from the electrode to one of the mobile nanoparticle cluster 122 (via intermediate contact potential differences) from the collisions induced by Brownian motion. The selection of nanoparticle clusters involves the size and coating of particles so that they will exhibit Brownian motion, resist agglomeration and have suitable work functions. For example, electrodes composed of Tungsten with Cesium oxide and platinum have work functions of 0.88 and 5.65 eV, respectively, produce a contact potential difference (CPD) of approximately 4.77 eV. The selection of silver (Ag) and gold (Au) nanoparticles have intermediate work functions of 3.8 ($\varphi_1$) and 4.1 eV ($\varphi_2$), respectively, that optimize the transfer of electrons to the nanoparticle clusters 122 and electrodes within the nanofluid CPD cell 100. The energy transferred per collision (ETC) of the two different nanoparticles (Au and Ag) and the electrodes composed of tungsten coated with cesium oxide and platinum is calculated in a similar manner as Equations 14 and 15 where $\varphi_1$ and $\varphi_2$ are the electron work functions of metals 1 and 2, respectively, T is the absolute temperature (373° K), k is the Boltzmann constant ($8.62 \times 10^{-5}$ eV/° K), and $A_r$ is the Richardson constant (Au=$0.9 \times 10^4$ and Ag=$0.74$ A/m$^2$K$^2$). The work function of metals gold (Au), $\varphi_2$, and silver (Ag), $\varphi_1$, are greater than the work function of the cathode 110 composed of tungsten (W) with cesium oxide (that has a work functions of 0.88 eV). The current, $j_1$, produced by the collision of the gold (Au) nanoparticle (0.014 A/m$^2$) with the cathode 110 is greater than the reverse current, $j_2$. Likewise, the current difference, $j_1-j_2$, produced by the collision of the silver (Ag) nanoparticle with the electrode composed of tungsten (W) is close to 0.014 A/m$^2$. Additionally, the current difference ($j_1-j_2$) produced by the collisions of Au and Ag nanoparticles with the platinum electrode is very small. These platinum metal collisions are ignored because they are so small. Since the area of the electrodes is $10^{-2}$ m$^2$ and using the low material work function transfer to the nanoparticle cluster currents, the current transferred by both the Ag and Au nanoparticle clusters is about 0.00014 A (or 0.14 mA). For a battery of 35 nanofluid CPD cells 100, the production is about 5 mA continuously produced at 4.77 volts, of which 0.024 watts is due to gold and silver nanoparticle clusters colliding with the low work function cathode 110.

Calculation of the Collision Frequency in a Fluid

Figure 8:
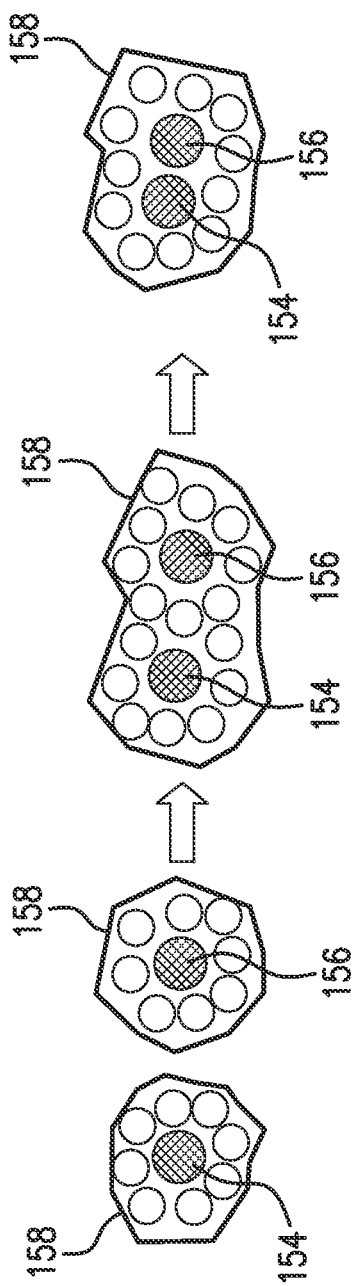
FIG. 8 shows two nanoparticle clusters (NPCs) and associated solvent cages.

The nanofluid 118 of the nanofluid CPD cell 100 is composed of nanoparticle clusters 122 with different work functions confined in the interstitial space 116. The nanofluid 118 transfers both heat (thermal energy) and power (the intermittent contact between the different metal materials initiates a transfer of charge) as shown in FIG. 8. FIG. 8 shows a first NPC 154 of type A, a second NPC 156 of type B, and solvent cages 158.

The nanofluid 118 has dissimilar nanoparticle clusters 122 to generate charge (via intermediate contact potential differences) from the collisions induced by Brownian motion. The selection of nanoparticles involves the size and coating of particles that would exhibit Brownian motion indefinitely and their respective work function differences. The selection of silver (Ag) and gold (Au) nanoparticles have intermediate work functions of 3.8 ($\varphi_1$) and 4.1 eV ($\varphi_2$), respectively, that optimize the transfer of electrons to the nanoparticle clusters 122 and to the cathode 110 and anode 112.

The energy transferred per collision (ETC) of the two different nanoparticles (Au and Ag) is calculated in a similar manner as Equation 14 and 15 where $\varphi_1$ and $\varphi_2$ are the electron work functions of metals 1 and 2, T is the absolute temperature (373° K), k is the Boltzmann constant ($8.62 \times 10^{-5}$ eV/° K), and $A_r$ is the Richardson constant ($0.74 \times 10^4$ for Ag and $0.9 \times 10^4$ for Au A/m$^2$K$^2$). The work function of metal 2 (Au), $\varphi_2$, is greater than the work function of metal 1, $\varphi_1$ (Ag), then the current, $j_1$, is greater than current $j_2$, ($4.8 \times 10^{-43}$ A/m$^2$ and $2.1 \times 10^{-5}$%/m$^2$, respectively). Since the area of one of the nanoparticle clusters 122 is about $3 \times 10^{-18}$ m$^2$, the current transferred is about $1.4 \times 10^{-60}$ (or ~$10^{60}$) A/collision.

The description of collisions in solution must take into account the displacement of solvent compounds. The solvent cage theory is used to predict the number of collisions between the two conducting nanoparticle clusters (NPCs) (Brezonik, 2011). The frequency of collision between NPCs in two solvent cages is derived from principles of random molecular diffusion which is assumed to have a mean free path ($\lambda$) of 2r (where r is the molecular radius).

The Einstein-Smoluchowski diffusion coefficient of a spherical particle in water at 20° C. is (Hinds, Aerosol Technology, p. 136, 1982) as shown in Equation 26:

$$D = \frac{kt}{3\pi\mu d} = 4.27 \times 10^{-5} \text{cm}^2/\text{s} \qquad \text{Equation 26}$$

where k is the Boltzmann's constant ($1.38 \times 10^{-16}$), t is the temperature (slightly under 373 K), $\mu$ is the viscosity of water (0.01005 poise), and d is the diameter of particle (0.002 μm (2 nanometers (nm)). One wants to operate in a planar device that is very thin because every collision event between NPCs will be outside the double layer zone (approximately 30 nm) and rapidly transport the ion through the charged zone to reach the electrode. The fluid will also transport ion current. Assuming NPCs are in a 10 nm (10×10⁻⁹ m)×0.1 m×0.1 m slab, the diffusion coefficient can be expressed as in Equation 27 (Hinds, Aerosol Technology, p. 140, 1982):

$$D = \frac{\lambda^2}{2\tau} \quad \text{Equation 27}$$

where $\lambda$ is the mean free path displacement along any axis during a time $\tau$. The mean free path for water ($\lambda$) is approximately 4 angstroms [or $4 \times 10^{-8}$ cm]. The diffusion coefficient D is approximately $1 \times 10^{-5}$ cm²/s along with a mean free path of 4 angstrom that results in the amount of time that a water molecule resides in a solvent cage of $\tau$ of $2.5 \times 10^{-11}$ s.

The number of collisions of the two NPCs is based on the frequency that the two materials encounter each other in the solvent cage. The frequency that the two NPCs encounter each other in the solvent cage ($\tau$) is found in Equation 28:

$$\frac{1}{\tau} = 25 r_{AB} D_{AB} n_B \quad \text{Equation 28}$$

where $r_{AB}$ is the radii of the joined NPCs [(two five NPCs joined) $10 \times 10^{-9}$ m or $1.0 \times 10^{-6}$ cm], $D_{AB}$ is the diffusion coefficient $(D_A + D_B)$ [$D_A = D_B = 1 \times 10^{-5}$ cm²/s], and $n_B$ is the mole fraction of NPC type B. The number of collisions of the NPCs (type A and B) per cm³ is given by Equation 5 multiplied by the number of NPCs (type A) per cm³. If the concentration [A] and [B] is 1000 mole/liter [1000 M], we can multiply by Avogadro's number $N_A$ ($6.02 \times 10^{23}$ molecules/mole) [along with the conversion of liters to cm³ ($N_A$ divided by 1000)] and the collision frequency ($Z_{C,AB}$ with units of molecules⁻¹ s⁻¹) becomes Equation 29:

$$Z_{C,AB} = 2.5 \times 10^{-2} r_{AB} D_{AB} N_0 [A][B] \quad \text{Equation 29}$$

where after dividing both sides of the Equation by [A] and [B], the resulting $Z_{C,AB}$ is $1.2 \times 10^{18}$ per molecule per second.

Figure 9:
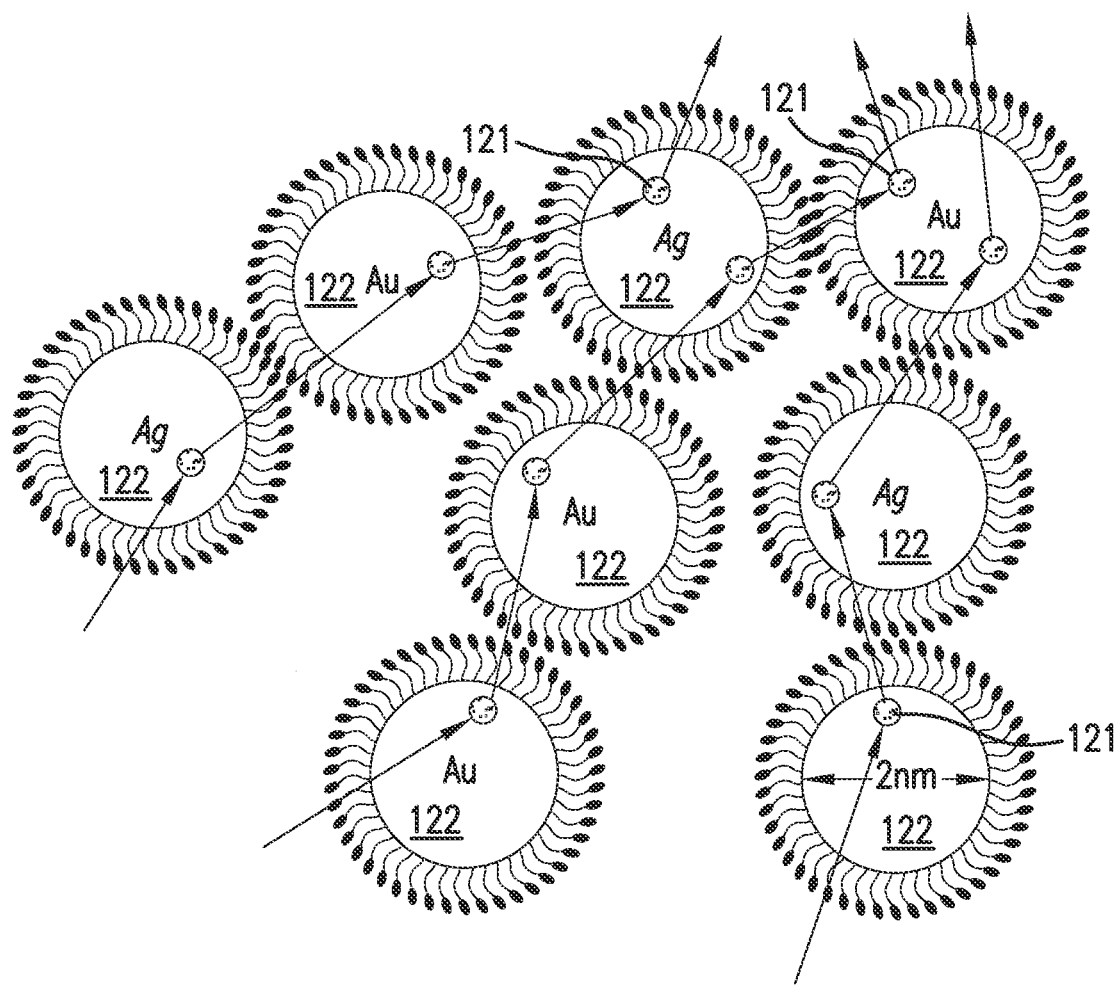
FIG. 9 is a schematic of collisions of Nanoparticle Clusters (NPC) that generate power.

Current Production Capability of the Nanofluid Due to Collisions of Different Nanoparticle Clusters The electrons transferred as a result of the collision frequency of the nanoparticle clusters (NPC) is calculated by multiplying the amount of electrons transferred per collision by the number of NPCs per nanofluid CPD cell 100 (see FIG. 9). The energy transferred per collision (ETC) of the two different nanoparticles (Au and Ag) is shown in Equation 30 to be approximately $10^{-60}$ A per collision.

$$ETC = (10^{-60} \text{ A/collision})(1.2 \times 10^{18} \text{ NPCcollision/sec}) \quad \text{Equation 30}$$

The number of NPCs per volume of nanofluid CPD cell 100 is determined from the volume of an individual NPC that is $4/3 \pi r^3$ or $4 \times 10^{-27}$ m³/NPC where the nanofluid CPD cell volume (100 mm by 100 mm by 100 nm) is $10^{-9}$ m³. The amount of current generated is found by multiplying $2.5 \times 10^{16}$ NPC per nanofluid CPD cell by the amps transferred per collision ($10^{-60}$ A/collision) times the number of collisions ($1.2 \times 10^{18}$) that generates $3 \times 10^{-26}$ Amps per nanofluid CPD cell. The amount of power (watts=volts amps) generated per nanofluid CPD cell is $1.4 \times 10^{-25}$ W per nanofluid CPD cell due to silver and gold particle collisions.

Nanofluid CPD Battery Prototype

A prototype nanofluid CPD battery has been produced and the power generated was in the range of milliwatts. This amount of power agreed with the theory presented above.

Figure 12:
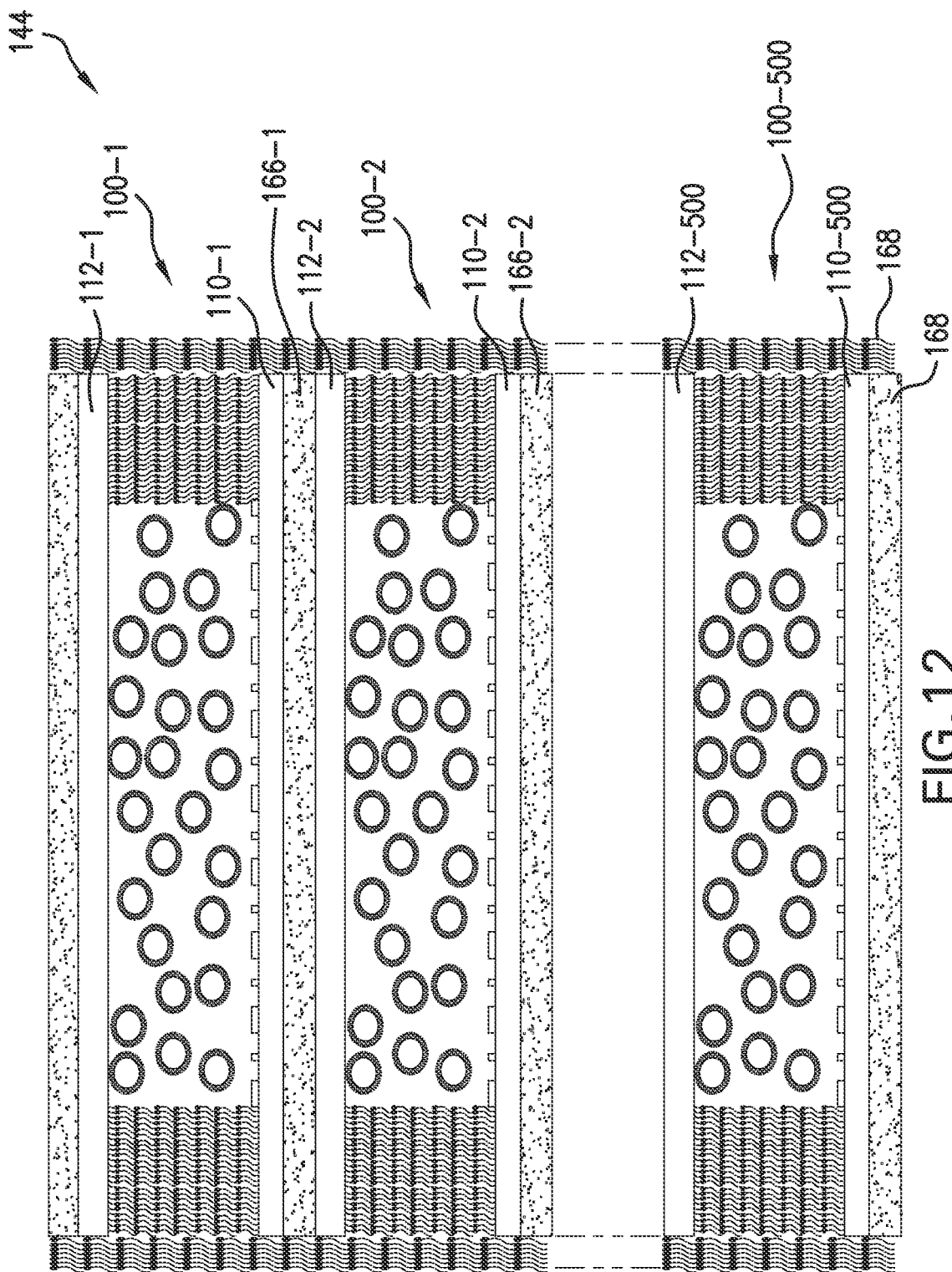
FIG. 12 shows a schematic sectional side view of a CPD battery with a stack of 500 nanofluid CPD cells.

The nanofluid CPD battery prototype build has 500 nanofluid CPD cells. A schematic side sectional view of the prototype CPD battery 144 is shown in FIG. 12. Each nanofluid CPD cell 100 had a width of 1 cm and a length of 4 cm. The thickness of the nanofluid CPD cells varied with the first CPD cell fabricated had a 150 nm gap between the cathode and anode, later fabricated cells with decreasing gaps as experience was gained until the last 10 cells had electrode gaps of about 10 nm (the variation in thickness is not shown in FIG. 12).

Each anode 112 was fabricated from a 1 cm by 4 cm copper foil that was electrosprayed with a platinum solution (0.2 M platinum nanoparticles). The deposited platinum nanoparticles covalently bond to the surface of the copper foil.

Each cathode 110 was fabricated using the techniques described elsewhere herein. A tungsten (W) foil 1 cm by 4 cm by 0.003 mm thick (purchased from Sigma-Aldrich, product number 267538) was used as the substrate surface for the cathode. A cesium oxide monolayer was electrosprayed through a template 164 onto one side of the tungsten foil to achieve a 0.5 monolayer (50% coverage). The electrosprayed solution was composed of 0.1 M cesium oxide in ethanol. The template 164 was used to form a pattern of cesium oxide on the tungsten foil. Several different templates were tried. The goal was to change template patterns to find the optimum coverage for the minimum work function. The template that gave the largest work function reduction was a pattern of 50 micron diameter holes with a center-to-center distance of 200 microns, staggered at 45 degree angles. The electrosprayed solution was composed of 0.1 M cesium oxide.

The charge transfer from the cesium oxide to the tungsten substrate is observed from the Cs induced surface dipole formation and lowering of the cathode 110 work function. The Cs effect saturates at coverage of 0.5 monolayer (ML) and this break point coincides with the achievement of the minimum work function. This break point is due to the different charge transfer from the cesium oxide adsorption and bonding to the tungsten substrate at different cesium oxide coverage. The depolarization of the surface dipoles is attributed to the saturation of charge transfer to the surface tungsten atoms and the polarization of the cesium oxide atoms. The dependence of the cathode work function on the cesium oxide coverage can be explained conceptually by the formation of surface dipoles and dipole depolarization as a result of dipole-dipole repulsions. The initial quick decrease of the work function is caused by the large charge transfer from the cesium oxide to the tungsten substrate, while the saturation of the cesium oxide charge transfer to the surface tungsten atoms causes the decrease of the work function to slow down between 0.25 ML and 0.5 ML of cesium oxide coverage. Lastly, the lack of change in the work function between 0.5 ML and 1 ML of cesium oxide coverage is consistent with the polarization of the cesium oxide atoms which generates a dipole in a reverse direction to offset the limited additional charge transfer from the cesium oxide atoms to the tungsten substrate. The resultant patterned electrospray-deposited of cesium oxide on a tungsten (1 cm by 4 cm) substrate produced a covalently-bonded electrode with a work function around 0.88 eV (with a Richardson constant of $8 \times 10^4$ A/m²° K²).

Five hundred anodes and five hundred cathodes were combined in a stack alternating cathode/anode/cathode/anode so that 500 cells were stacked one on top of the other with a thin inter-cell insulating layer 166 of alkane-thiol separating each cell. A leak-tight seal 168 was formed by electrospraying an alkane-thiol organic film gasket around the edge of each electrode on both sides. Nanofluid 118 was inserted in the interstitial spaces 116 of the individual nanofluid CPD cells 100 by capillary action prior to applying the seal.

The energy density of the nanofluid CPD battery prototype was measured to be 0.120 kWh per liter while a lithium battery is 1.12 kWh per liter. The energy density of the nanofluid CPD battery is approximately a factor of ten less than the lithium battery. The difference is that the nanofluid CPD battery performance does not decline as a function of the discharging rate. Therefore, if one did the energy density measurement as a function of 1000 hours (more of a life cycle measurement), the nanofluid CPD battery compares favorably since the recharging cycle found with typical batteries is eliminated.

The typical charge acceptance rates do not apply to the nanofluid CPD battery because it is not an electrochemical battery. However, the placement of a super or ultracapacitor with the nanofluid CPD battery enables the rapid storage of power. Therefore, the charge acceptance rate is very high (due to the capacitors) when compared with an electrochemical battery.

The cost per watt is from CPD Battery prototype measurements and is expected to be close to a mass produced cost of $1 per 0.120 kWh which is $8.33 per kWh. Lithium battery technology is about to achieve $200 per kWh. This CPD Battery cost includes using the Janus nanoparticles-particles that have a hemispherical coating that produces both a negative and positive charge on the same nanoparticle—as a surfactant.

The weight per kilowatt hour for a lead-acid battery is 25 Kg per kWh. The nanofluid CPD battery is 0.120 kWh per kilogram which is about 8.3 Kg per kWh. The nanofluid CPD battery is about a factor of 4 times more efficient as a function of weight than typical batteries.

Passive Cooling of a Nanofluid CPD Battery

This section demonstrates that a battery of the nanofluid CPD cells stacked 35 cells deep can harvest thermal energy from an integrated electronic chip on a mobile electronic device such as a phone and rely on passive cooling.

Low-power electronic systems are usually cooled passively with a combination of natural convection and radiation. Passive cooling is very desirable, since it does not involve any fans that may break down or consume harvested energy. Natural convection is based on the fluid motion caused by the density differences in a fluid due to a temperature difference. A fluid expands when heated and becomes less dense.

Figure 4:
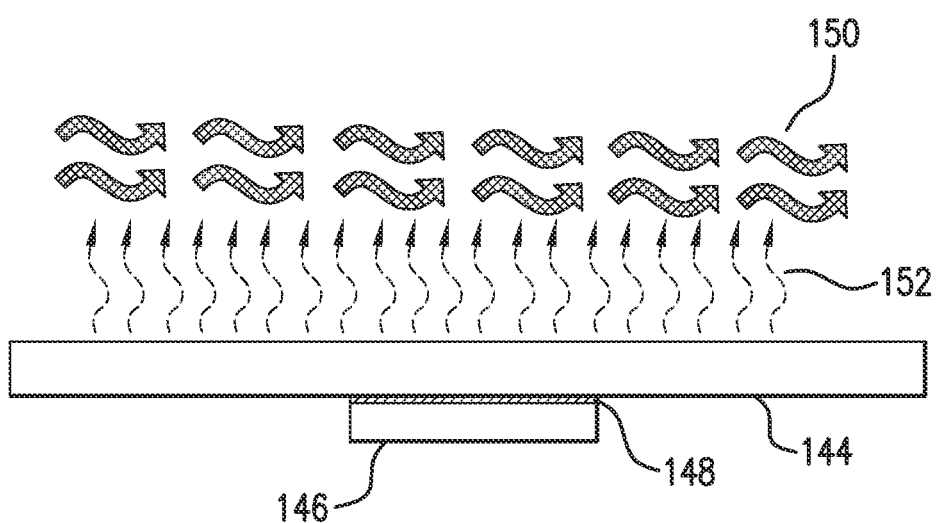
FIG. 4 is a cross-section schematic of a nanofluid CPD cell harvesting energy from an electronic chip and cooled passively by natural convection and radiation.

FIG. 4 shows an electronic chip 146 glued with an epoxy adhesive 148 to a nanofluid CPD battery 144 of 35 stacked nanofluid CPD cells (35 individual cells) cooled by natural convection. The temperature difference is driven by an electronic chip 146 operating around 100° C. Using the thermal resistance approach, the total dissipated power, P, measured in the units of watts, W, is found in Equation 3:

$$P = VI = I^2 R \qquad \text{Equation 3}$$

In steady state operation, this is equivalent to the heat dissipated by an electronic component consuming the power (see Equation 3). The total rate of heat transfer, Q, is determined by Equation 4:

$$Q = \frac{\Delta T}{R} = \frac{L}{kA} \qquad \text{Equation 4}$$

where $\Delta T$ is the temperature difference (° C.) and the thermal resistance to heat flow, R, has units of ° C./W, k is the thermal conductivity (W/m ° C.), L is the thickness of the material (m), and A is the heat transfer area. The total resistance to heat transfer can be calculated as found in Equation 5.

$$R_{SYS} = R_{Adhesive} + R_{CHIP} + R_{CPD} \qquad \text{Equation 5}$$

where the total heat transfer resistance of the system, $R_{SYS}$, is equal to the sum of the thermal resistances of the epoxy adhesive 148, $R_{Adhesive}$, joining to the resistance of the electronic chip 146, $R_{CHIP}$), added to the resistance of one nanofluid CPD cell 100, $R_{CPD}$. For example, the thermal resistance of the epoxy adhesive can be found by solving Equation 3 for $R_{Adhesive}$ where the thickness of the epoxy is $0.03 \times 10^{-3}$ m is divided by the thermal conductivity (1.8 W/m ° C.) and the heat transfer area ($10^{-4}$ m$^2$). The $R_{Adhesive}$ is determined to be 0.167° C./W. Similarly, the $R_{CHIP}$ is calculated by using the thickness of the chip ($0.4 \times 10^{-3}$ m) divided by the thermal conductivity of silicon (around 100° C. k is 120 W/m ° C.) and the heat transfer area ($10^{-4}$ m$^2$). The thermal resistance of the electronic chip is found to be 0.033° C./W. The thermal resistance for resistance of the nanofluid CPD cell, $R_{CPD}$, has to be calculated by summing each component part to determine its resistance to heat flow (see Equation 6).

$$R_{CPD} = R_{Tungsten} + R_{Nanofluid} + R_{Pt} \qquad \text{Equation 6}$$

$R_{Tungsten}$ and $R_{Pt}$ are the thermal resistances of tungsten and platinum, respectively. The $R_{Tungsten}$ is calculated by using the electrode thickness ($20 \times 10^{-6}$ m) divided by the thermal conductivity (173 W/m ° C.) and the heat transfer area ($10^{-2}$ m$^2$). The $R_{Tungsten}$ is found to be $1.15 \times 10^{-5}$° C./W. The platinum electrode thermal resistance, $R_{Pt}$, is found by using the electrode thickness ($20 \times 10^{-6}$ m) divided by the thermal conductivity (71.6 W/m ° C.) and the heat transfer area ($10^{-2}$ m$^2$). The $R_{Pt}$ is found to be $2.79 \times 10^{-5}$° C./W. The thermal resistance of the nanofluid, $R_{Nanofluid}$ is calculated by determining the thermal conductivity of the particles and the fluid. The thermal conductivity of the nanofluid is calculated by Equation 7 [DeWitt, 2011]:

$$k_{NF} = \left[\frac{k_p + 2k_{BF} + 2\psi(k_p - k_{BF})}{k_p + 2k_{BF} - \psi(k_p - k_{BF})}\right] k_{BF} \qquad \text{Equation 7}$$

where $k_P$ is the particle thermal conductivity (318 W/m ° K), $k_{BF}$ is the thermal conductivity of the bulk fluid (0.613 W/m ° K), and w is the particle volume fraction (10%). After substituting into Equation 6, the thermal conductivity of the nanofluid, $k_{NF}$ is found to be 0.816 W/m ° K. Thereafter, the $R_{Nanofluid}$ is calculated to be $1.22 \times 10^{-6}$° C./W with a thickness of 10 nanometers ($10 \times 10^{-9}$ m) and a heat transfer area of $10^{-2}$ m$^2$. Therefore, the thermal resistance of the nanofluid CPD cell, $R_{CPD}$, is $4.0 \times 10^{-5}$° C./W. Finally, the $R_{SYS}$ is 0.2° C./W. Calculating the temperature at the connection with the second nanofluid CPD cell, $T_1$, where 8 W of electrical power have been dissipated (above the first nanofluid CPD cell exposed to the natural convection of air) is shown in Equation 8:

$$T_1 = T_0 + (Q)R_{SYS} = 45 + (8 \text{ W})(0.2 \text{ C/W}) = 46.6 \qquad \text{Equation 8}$$

where $T_0$ is the ambient air worst-case of 45° C. and $T_1$ is found to be 46.6° C. Approximately 35 layers of nanofluid CPD cell 100 are used in this design to reach the electronic temperature of 100° C.

The following calculations show that natural convection combined with radiative heat transfer is sufficient to remove 8 W in a typical mobile phone application. The temperature difference is important in natural convection where $\Delta T = T_S - T_{AMB}$ is the temperature difference between the surface and the fluid, $L_c$ is the characteristic length (the length of the body along the heat flow path), and A is the heat transfer area and P is the perimeter. The natural convection from the planar face of the nanofluid CPD cell assembly can move the following amounts of heat that depend on the geometry of the body $L_C$ (see Equation 9):

$$L_C = 4\frac{A}{P} = \frac{4(0.01)}{2(0.2)} = 0.1 \qquad \text{Equation 9}$$

The natural convection heat transfer coefficient for laminar flow of air at atmospheric pressure is given by a simplified relation of the form found in Equation 10:

$$h_{Conv} = (1.32)\left[\frac{\Delta T}{L_C}\right] = 6.39 \qquad \text{Equation 10}$$

Once $h_{Conv}$ has been determined from Equation 10, the rate of heat transfer from natural convection, $Q_{Conv}$, can be determined from Equation 11:

$$Q_{Conv} = h_{Conv} A (T_S - T_{AMB}) = 3.5 \text{ W} \qquad \text{Equation 11}$$

The mobile device with the nanofluid CPD battery 144 is completely surrounded by the surfaces of the room, and it is assumed that the temperature of the room surface facing the nanofluid CPD battery 144 is equal to the air temperature in the room. Then, the rate of heat transfer from the nanofluid CPD battery 144 by radiation can be determined from Equation 12:

$$Q_{Rad} = \varepsilon A \sigma (T_S - T_{AMB}) = 0.85(0.01)(5.67 \times 10^{-8})(373^4 - 318^4) = 4.5 \text{ W} \qquad \text{Equation 12}$$

where .di-elect cons. is the emissivity of the surface (0.85 for a phone), A is the heat transfer surface area (0.01 m²), and σ is the Stefan-Boltzmann constant, whose value is $5.67 \times 10^{-8}/\text{w/m}^{2\circ}\text{K}^4$, and the temperature difference between the nanofluid CPD cell surface, $T_S$, and the temperature of the air (or fluid), $T_{AMB}$ (45° C.). Then, the total heat transfer from the nanofluid CPD battery 144 can be found in Equation 13:

$$Q_{Total} = Q_{Conv} + Q_{Rad} = 3.5 + 4.5 = 8 \text{ W} \qquad \text{Equation 13}$$

which is approximately the worst-case power dissipation of 8 watts. Therefore, this CPD battery 144 can be cooled by combined natural convection and radiation, and there is no need to install any fans. There is even some safety margin left because the air temperature rarely rises above 35° C. Most importantly, any harvested electrical power does not need to be used to cool the device.

Nanofluid CPD Battery Integration with Thermal Sources

Figure 10:
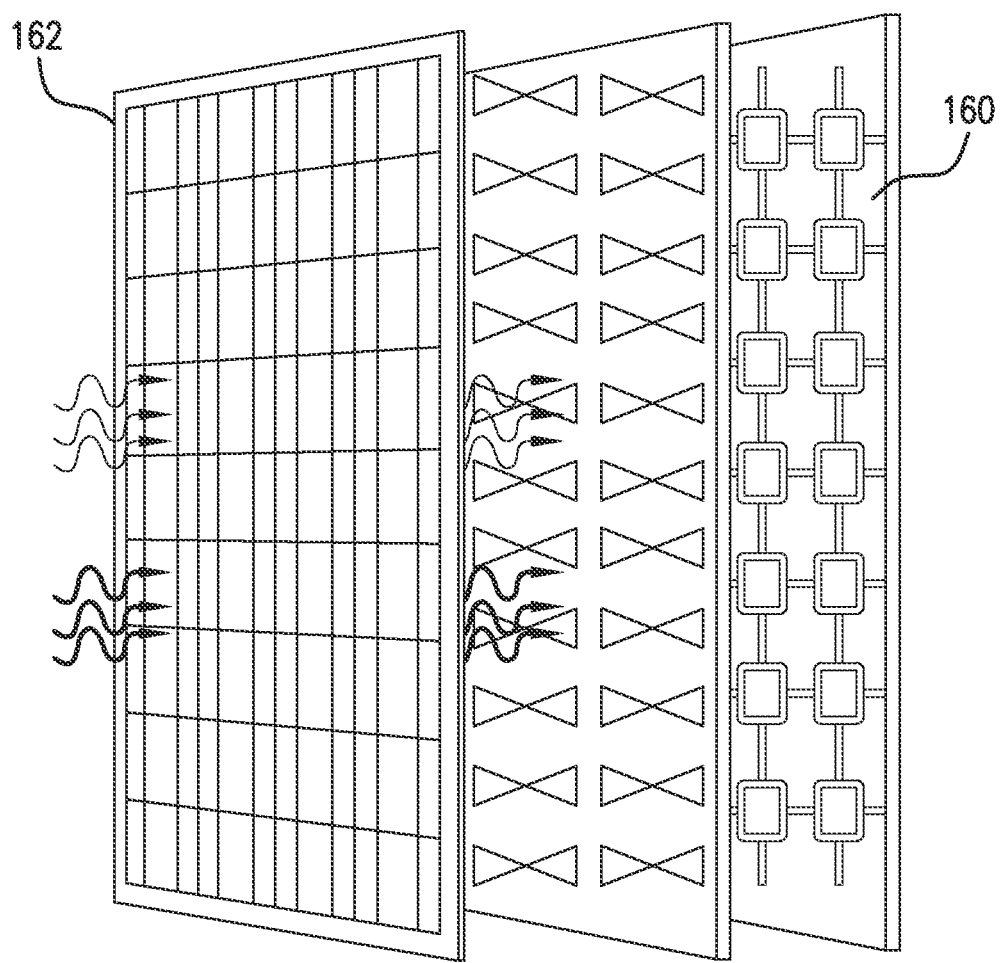
FIG. 10 shows the integration of a nanofluid CPD battery array with a solar cell array.

The nanofluid CPD battery can be integrated with multiple energy-harvesting devices to produce a greater energy-density device. For example, the integration of a nanofluid CPD battery array 160 with a solar battery array 162, allows the nanofluid CPD battery array 160 to both cool the solar battery array 162 and synergistically generate power to augment photovoltaic production. (See FIG. 10).

By any measure, the nanofluid CPD battery will be considered a thermal energy harvester that is the result of advances in nanoparticle manufacturing, rapid mass-production of thin film, and innovative application of proven but heretofore unrealized exploitation of the development of the machine that can reliably mass-produce angstrom-scale particles and nanoscale thin films.

The nanofluid CPD battery has the potential to reorder the world's energy landscape, end the global economic drag of soaring energy costs, and eventually curb greenhouse gas emissions that are blamed for climate change.

Those skilled in the art will recognize that numerous modifications and changes may be made to the exemplary embodiment without departing from the scope of the claimed invention. It will, of course, be understood that modifications of the invention, in its various aspects, will be apparent to those skilled in the art, some being apparent only after study, others being matters of routine mechanical, chemical and electronic design. No single feature, function or property of the exemplary embodiment is essential. Other embodiments are possible, their specific designs depending upon the particular application. As such, the scope of the invention should not be limited by the particular embodiments herein described but should be defined only by the appended claims and equivalents thereof.

What is claimed is:

1. An apparatus comprising:
   a first electrode having a first work function;
   a second electrode having a second work function that is different than the first work function, wherein the second electrode comprises a refractory layer and a thin film partially covering a surface of the refractory layer;
   an insulator between the first electrode and the second electrode; and
   a nanofluid between the first electrode and the second electrode, the nanofluid comprising a plurality of nanoparticles, wherein some of the nanoparticles have a different work function than others of the nanoparticles.

2. The apparatus of claim 1, wherein the thin film comprises electrosprayed dipole nanoparticle clusters.

3. The apparatus of claim 1, wherein the thin film comprises cesium oxide, barium oxide, calcium oxide, strontium oxide, or a combination thereof.

4. The apparatus of claim 1, wherein the refractory layer comprises tungsten, rhenium, osmium, ruthenium, tantalum, iridium, or a combination thereof.

5. The apparatus of claim 1, wherein the refractory layer comprises an alkaline earth metal combined with tungsten, rhenium, osmium, ruthenium, tantalum, platinum, iridium, or a combination thereof.

6. The apparatus of claim 1, wherein the first electrode comprises platinum.

7. The apparatus of claim 1, further comprising: a switch configured to selectively establish a connection between the first electrode and the second electrode, wherein the selective connection is based on a first value of a first current from the second electrode to the first electrode, a second value of a second current from the first electrode to the second electrode, or a combination thereof.

8. The apparatus of claim 7, wherein the switch is further configured to disconnect the selective connection responsive to the first value of the first current being substantially equal to the second value of the second current.

9. The apparatus of claim 8, wherein the switch is further configured to re-connect the first electrode and the second electrode to re-establish non-equilibrium of the first current and the second current.

10. The apparatus of claim 9, wherein the switch is a plasma switch.

11. The apparatus of claim 1, wherein the plurality of nanoparticles include first nanoparticles comprising gold and second nanoparticles comprising silver.

12. The apparatus of claim 1, wherein the insulator comprises alkane-thiol.

13. The apparatus of claim 1, wherein the plurality of nanoparticles each have a size in a range of 3-8 nanometers.

14. The apparatus of claim 1, wherein the first electrode and the second electrode are spaced from one another by about 10 nanometers.

15. The apparatus of claim 1, wherein the thin film comprises cesium oxide.

16. The apparatus of claim 15, wherein the thin film of cesium oxide is configured to induce production of covalently-bonded dipoles on a surface of the refractory layer of the second electrode.

17. The apparatus of claim 1, wherein the nanoparticles comprise a ligand shell extending over at least a portion of the nanoparticles.

18. The apparatus of claim 1, wherein the thin film of the second electrode comprises a thermionic emissive material.

19. The apparatus of claim 1, wherein the first electrode and the second electrode are configured to generate a thermoelectric current.

20. The apparatus of claim 1, wherein the plurality of nanoparticles are configured to transfer charge and heat energy between the first and second electrodes.

* * * * *